US011680629B2

(12) United States Patent
Hofmann et al.

(10) Patent No.: US 11,680,629 B2
(45) Date of Patent: Jun. 20, 2023

(54) LOW COST WAVE GENERATORS FOR METAL STRAIN WAVE GEARS AND METHODS OF MANUFACTURE THEREOF

(71) Applicant: California Institute of Technology, Pasadena, CA (US)

(72) Inventors: Douglas C. Hofmann, Altadena, CA (US); Brian H. Wilcox, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 385 days.

(21) Appl. No.: 16/802,249

(22) Filed: Feb. 26, 2020

(65) Prior Publication Data

US 2020/0278016 A1    Sep. 3, 2020

Related U.S. Application Data

(60) Provisional application No. 62/811,765, filed on Feb. 28, 2019.

(51) Int. Cl.
  *F16H 49/00*       (2006.01)
(52) U.S. Cl.
  CPC ..... *F16H 49/001* (2013.01); *F16H 2049/003* (2013.01)
(58) Field of Classification Search
  CPC .......................... F16H 49/001; F16H 2049/003
  See application file for complete search history.

(56) References Cited

U.S. PATENT DOCUMENTS 2,931,249 A * 4/1960 Walton ................. F16H 49/001
                                                      74/640
3,119,283 A * 1/1964 Bentov ................... F16H 61/02
                                                      74/640

(Continued)

FOREIGN PATENT DOCUMENTS

CN    101709773 A    5/2010
CN    102563006 A    7/2012

(Continued)

OTHER PUBLICATIONS

Chen et al., "Elastic Constants, Hardness and Their Implications to Flow Properties of Metallic Glasses", Journal of Non-crystalline Solids, Sep. 1, 1975, vol. 18, pp. 157-171.

(Continued)

*Primary Examiner* — Terence Boes

(57) ABSTRACT

Harmonic drives (HDs) are used widely in robotics as a method for achieving high gear reductions and for driving force transmissions. The HD is made a three components: a wave generator, a flexspline, and a circular spline. Low-cost wave generators for metal strain wave gearing are provided. Wave generators are provided that incorporate commercially available bearings that form an ellipse either statically or through adjustment. Wave generators are optimized to maximum performance, including increasing the efficiency and the lifetime, while maximizing the running torque. The shape, size, number, type and location of the bearings can be changed so that the wave generator fails at a similar lifetime as a low cost flexspline. The shape of the wave generator may be adjusted to change the performance of the strain wave gear. The combination of low-cost flexsplines with low-cost wave generators reduces the cost of the strain wave gear.

19 Claims, 23 Drawing Sheets

(56) References Cited

U.S. PATENT DOCUMENTS

| | | |
|---|---|---|
| 3,435,512 A | 4/1969 | Macrobbie |
| 3,519,444 A | 7/1970 | Brown et al. |
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk et al. |
| 4,173,393 A | 11/1979 | Maurer |
| 4,202,404 A | 5/1980 | Carlson |
| 4,584,036 A | 4/1986 | Taub et al. |
| 4,670,636 A | 6/1987 | Taub et al. |
| 4,711,795 A | 12/1987 | Takeuchi et al. |
| 4,749,625 A | 6/1988 | Obayashi et al. |
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,002,798 A | 3/1991 | Donley et al. |
| 5,005,456 A | 4/1991 | Ballard et al. |
| 5,168,918 A | 12/1992 | Okuda et al. |
| 5,185,198 A | 2/1993 | Lefeber et al. |
| 5,288,344 A | 2/1994 | Peker et al. |
| 5,310,432 A | 5/1994 | Yamanaka et al. |
| 5,417,385 A | 5/1995 | Arnold et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,323,071 B1 | 1/2008 | Branagan |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,044,805 B2 | 6/2015 | Prest et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,579,718 B2 | 2/2017 | Hofmann |
| 9,610,650 B2 | 4/2017 | Hofmann et al. |
| 9,689,231 B2 | 6/2017 | Fripp et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,471,652 B2 | 11/2019 | Hofmann et al. |
| 10,487,934 B2 | 11/2019 | Kennett et al. |
| 10,690,227 B2 | 6/2020 | Hofmann et al. |
| 10,883,528 B2 | 1/2021 | Hofmann et al. |
| 10,941,847 B2 | 3/2021 | Hofmann et al. |
| 10,953,688 B2 | 3/2021 | Parness et al. |
| 11,123,797 B2 | 9/2021 | Hofmann |
| 11,155,907 B2 | 10/2021 | Hofmann et al. |
| 11,168,776 B2 | 11/2021 | Hofmann et al. |
| 11,185,921 B2 | 11/2021 | Hofmann et al. |
| 11,198,181 B2 | 12/2021 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0039689 A1 | 2/2007 | Petersson et al. |
| 2007/0144621 A1 | 6/2007 | Farmer et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2007/0270942 A1 | 11/2007 | Thomas |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0246398 A1 | 10/2009 | Kurahashi et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0165339 A1 | 7/2011 | Skoglund et al. |
| 2011/0302783 A1 | 12/2011 | Nagata et al. |
| 2012/0006085 A1 | 1/2012 | Johnson et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0048152 A1 | 2/2013 | Na et al. |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1 | 10/2013 | Teulet |
| 2013/0280547 A1 | 10/2013 | Brandl et al. |
| 2013/0309121 A1 | 11/2013 | Prest et al. |

(56) References Cited

U.S. PATENT DOCUMENTS

| | | | |
|---|---|---|---|
| 2013/0316867 A1* | 11/2013 | Kobayashi | F16H 1/32 475/162 |
| 2013/0316868 A1* | 11/2013 | Kobayashi | F16H 1/32 475/180 |
| 2013/0333814 A1 | 12/2013 | Fleury et al. | |
| 2014/0004352 A1 | 1/2014 | McCrea et al. | |
| 2014/0010968 A1 | 1/2014 | Prest et al. | |
| 2014/0020794 A1 | 1/2014 | Hofmann et al. | |
| 2014/0030948 A1 | 1/2014 | Kim et al. | |
| 2014/0045680 A1 | 2/2014 | Nakayama et al. | |
| 2014/0048969 A1 | 2/2014 | Swanson et al. | |
| 2014/0070445 A1 | 3/2014 | Mayer | |
| 2014/0083640 A1 | 3/2014 | Waniuk et al. | |
| 2014/0090752 A1 | 4/2014 | Waniuk et al. | |
| 2014/0093674 A1 | 4/2014 | Hofmann et al. | |
| 2014/0130158 A1 | 5/2014 | Wang et al. | |
| 2014/0141164 A1 | 5/2014 | Hofmann | |
| 2014/0163717 A1 | 6/2014 | Das et al. | |
| 2014/0202595 A1 | 7/2014 | Hofmann | |
| 2014/0203622 A1 | 7/2014 | Yamamoto et al. | |
| 2014/0213384 A1 | 7/2014 | Johnson et al. | |
| 2014/0224050 A1* | 8/2014 | Hofmann | B22D 13/00 29/893.3 |
| 2014/0227125 A1 | 8/2014 | Hofmann | |
| 2014/0246809 A1 | 9/2014 | Hofmann et al. | |
| 2014/0293384 A1 | 10/2014 | O'keeffe et al. | |
| 2014/0312098 A1 | 10/2014 | Hofmann et al. | |
| 2014/0332120 A1 | 11/2014 | Liu et al. | |
| 2014/0334106 A1 | 11/2014 | Prest et al. | |
| 2014/0342179 A1 | 11/2014 | Hofmann et al. | |
| 2014/0348571 A1 | 11/2014 | Prest et al. | |
| 2015/0014885 A1 | 1/2015 | Hofmann et al. | |
| 2015/0044084 A1 | 2/2015 | Hofmann et al. | |
| 2015/0047463 A1 | 2/2015 | Hofmann et al. | |
| 2015/0068648 A1 | 3/2015 | Schroers et al. | |
| 2015/0075744 A1 | 3/2015 | Hofmann et al. | |
| 2015/0158067 A1 | 6/2015 | Kumar et al. | |
| 2015/0165693 A1 | 6/2015 | Sagoo et al. | |
| 2015/0183169 A1 | 7/2015 | Ehsani | |
| 2015/0209094 A1 | 7/2015 | Anderson | |
| 2015/0209889 A1 | 7/2015 | Peters et al. | |
| 2015/0219572 A1 | 8/2015 | Beuth, Jr. et al. | |
| 2015/0284035 A1 | 10/2015 | Reese | |
| 2015/0289605 A1 | 10/2015 | Prest et al. | |
| 2015/0298443 A1 | 10/2015 | Hundley et al. | |
| 2015/0299825 A1 | 10/2015 | Poole et al. | |
| 2015/0314566 A1 | 11/2015 | Mattlin et al. | |
| 2015/0323053 A1 | 11/2015 | El-Wardany et al. | |
| 2015/0352794 A1 | 12/2015 | Nguyen et al. | |
| 2016/0023438 A1 | 1/2016 | Johnson et al. | |
| 2016/0175929 A1 | 6/2016 | Colin et al. | |
| 2016/0178047 A1 | 6/2016 | Kennett et al. | |
| 2016/0186850 A1 | 6/2016 | Hofmann et al. | |
| 2016/0233089 A1 | 8/2016 | Zenou et al. | |
| 2016/0242877 A1 | 8/2016 | Bernhard | |
| 2016/0258522 A1* | 9/2016 | Hofmann | B22D 19/0036 |
| 2016/0263937 A1 | 9/2016 | Parness et al. | |
| 2016/0265576 A1 | 9/2016 | Hofmann et al. | |
| 2016/0299183 A1 | 11/2016 | Lee | |
| 2016/0327683 A1 | 11/2016 | Donzier et al. | |
| 2016/0361765 A1 | 12/2016 | Danger et al. | |
| 2016/0361897 A1 | 12/2016 | Hofmann et al. | |
| 2017/0021417 A1 | 1/2017 | Martin et al. | |
| 2017/0050241 A1 | 2/2017 | Thomas et al. | |
| 2017/0121799 A1 | 5/2017 | Hofmann et al. | |
| 2017/0137955 A1 | 5/2017 | Hofmann et al. | |
| 2017/0144225 A1 | 5/2017 | Hofmann | |
| 2017/0211168 A1 | 7/2017 | Liu et al. | |
| 2017/0226619 A1 | 8/2017 | Hofmann et al. | |
| 2017/0276225 A1* | 9/2017 | Takehana | F16H 49/001 |
| 2017/0321790 A1* | 11/2017 | Klassen | F16H 49/001 |
| 2018/0028088 A1 | 2/2018 | Garbey et al. | |
| 2018/0073355 A1 | 3/2018 | Bhongale et al. | |
| 2018/0119259 A1 | 5/2018 | Hofmann et al. | |
| 2018/0257141 A1* | 9/2018 | Hofmann | B23K 15/0086 |
| 2018/0272432 A1 | 9/2018 | Jonsson et al. | |
| 2018/0339338 A1 | 11/2018 | Hofmann et al. | |
| 2018/0339342 A1 | 11/2018 | Hofmann | |
| 2018/0345366 A1 | 12/2018 | Hofmann | |
| 2019/0009464 A1 | 1/2019 | Steege | |
| 2019/0022923 A1 | 1/2019 | Hofmann et al. | |
| 2019/0037721 A1 | 1/2019 | Curran et al. | |
| 2019/0126674 A1 | 5/2019 | Parness et al. | |
| 2019/0154130 A1 | 5/2019 | Hofmann et al. | |
| 2019/0170235 A1 | 6/2019 | Hofmann et al. | |
| 2019/0177826 A1 | 6/2019 | Hofmann et al. | |
| 2019/0195269 A1 | 6/2019 | Hofmann et al. | |
| 2019/0255635 A1 | 8/2019 | Hänni et al. | |
| 2019/0285608 A1 | 9/2019 | Laird et al. | |
| 2019/0314903 A1 | 10/2019 | Haenle et al. | |
| 2020/0000595 A1 | 1/2020 | Jones et al. | |
| 2020/0056578 A1 | 2/2020 | Sheldon-coulson et al. | |
| 2020/0278017 A1* | 9/2020 | Hofmann | F16H 49/001 |
| 2020/0282582 A1 | 9/2020 | Hofmann et al. | |
| 2020/0284146 A1 | 9/2020 | Yahnker et al. | |
| 2020/0318721 A1 | 10/2020 | Hofmann et al. | |
| 2020/0406579 A1 | 12/2020 | Hahnlen | |
| 2021/0254699 A1 | 8/2021 | Hofmann et al. | |
| 2021/0379661 A1 | 12/2021 | Hofmann | |
| 2022/0055114 A1 | 2/2022 | Hofmann et al. | |
| 2022/0212254 A1 | 7/2022 | Hofmann et al. | |

FOREIGN PATENT DOCUMENTS

| | | | |
|---|---|---|---|
| CN | 103153502 A | 6/2013 | |
| CN | 203227820 U | 10/2013 | |
| CN | 104117672 A | 10/2014 | |
| DE | 102005014972 A1 * | 10/2006 | F16H 49/001 |
| DE | 102010062089 A1 | 5/2012 | |
| DE | 112018001284 T5 | 11/2019 | |
| EP | 0127366 A1 | 5/1984 | |
| EP | 1063312 A1 | 12/2000 | |
| EP | 1138798 A1 | 10/2001 | |
| EP | 1696153 A1 | 8/2006 | |
| EP | 1404884 B1 | 7/2007 | |
| EP | 1944138 A2 | 7/2008 | |
| EP | 3630392 A1 | 4/2020 | |
| EP | 3630395 A1 | 4/2020 | |
| EP | 3630397 A2 | 4/2020 | |
| EP | 3129677 B1 | 9/2021 | |
| JP | 61276762 A | 12/1986 | |
| JP | 62227070 A | 10/1987 | |
| JP | 09121094 A | 5/1997 | |
| JP | 2002045960 A | 2/2002 | |
| JP | 2004315340 A | 11/2004 | |
| JP | 2004353053 A | 12/2004 | |
| JP | 2007040517 A | 2/2007 | |
| JP | 2007040518 A | 2/2007 | |
| JP | 2007247037 A | 9/2007 | |
| JP | 2008115932 A | 5/2008 | |
| JP | 2008264865 A | 11/2008 | |
| JP | 2010523822 A | 7/2010 | |
| JP | 2011045931 A | 3/2011 | |
| JP | 2012502178 A | 1/2012 | |
| JP | 2012046826 A | 3/2012 | |
| JP | 2012162805 A | 8/2012 | |
| JP | 2012214826 A | 11/2012 | |
| JP | 2013057397 A | 3/2013 | |
| JP | 5249932 B2 | 7/2013 | |
| JP | 2013238278 A | 11/2013 | |
| JP | 2013544648 A | 12/2013 | |
| JP | 2018149655 A | 9/2018 | |
| KR | 101420176 B1 | 7/2014 | |
| KR | 1020190119154 A | 10/2019 | |
| KR | 1020200004435 A | 1/2020 | |
| KR | 1020200011470 A | 2/2020 | |
| WO | 2005077560 A1 | 8/2005 | |
| WO | 2006073428 A2 | 7/2006 | |
| WO | 2007038882 A1 | 4/2007 | |
| WO | 2008058896 A1 | 5/2008 | |
| WO | 2008156889 A2 | 12/2008 | |
| WO | 2009069716 A1 | 6/2009 | |
| WO | 2010027317 A1 | 3/2010 | |
| WO | 2011159596 A1 | 12/2011 | |

(56) References Cited

FOREIGN PATENT DOCUMENTS

| WO | 2012031022 A2 | 3/2012 |
|---|---|---|
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of Fecrbsimnnby Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi: 10.1016/j.intermet.2010.08.040.
Choi et al., "Tribological behavior of the kinetic sprayed Ni59Ti16Zr20Si2Sn3 bulk metallic glass", Journal of Alloys and Compounds, May 31, 2007, vol. 434-435, pp. 64-67, doi:10.1016/j.jallcom.2006.08.283.
Conner et al., "Shear band spacing under bending of Zr-based metallic glass plates", Acta Materialia, Jan. 27, 2004, vol. 52, pp. 2429-2434, doi:10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi:10.1016/h,scriptamat.2007.10.040.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78, doi:10.1016/j.jallcom.2012.02.104.

Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified Ti40Zr10Cu38Pd12 metallic glass", Journal of the Mechanical Behavior of Biomedical Materials, May 27, 2011, vol. 4, pp. 1709-1717, doi:10.1016/j.jmbbm.2011.05.028.
Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on The PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3, http://dx.doi.org/10.1063/1.47699997.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066001225001067.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi:10.1038/nmat1984.
Ha et al., "Tensile deformation behavior of two Ti-based amorphous matrix composites containing ductile β dendrites", Materials Science and Engineering A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastictc Plastic Transition in Metallic Glass-Forming Liquids", Physical Review Letters, Sep. 28, 2007, vol. 99, 135502-1-135502-4, DOI: 10.1103/PhysRevLett.99.135502.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836, doi:10.1016/jactamat.2009.11.025.
Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.
Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.
Hofmann, "Shape Memory Bulk Metallic Glass Composites", Science, Sep. 10, 2010, vol. 329, pp. 1294-1295, doi:10.1126/science.1193522.
Hofmann et al., "Designing metallic glass matrix composites with high toughness and tensile ductility", Nature Letters, Feb. 28, 2008, vol. 451, pp. 1085-1090, doi:10.1038/nature06598.
Hofmann et al., "Development of tough, low-density titanium-based bulk metallic glass matrix composites with tensile ductility", PNAS, Dec. 23, 2008, vol. 105, pp. 20136-20140, www.phas.orgdgidoi/10.1073/pnas.0809000106.

(56) References Cited

OTHER PUBLICATIONS

Hofmann et al., "Improving Ductility in Nanostructured Materials and Metallic Glasses: Three Laws", Material Science Forum, 2010, vols. 633-634, pp. 657-663, published online Nov. 19, 2009, doi:10.4028/www.scientific.net/MSF.633-634.657.

Hofmann et al., "Semi-solid Induction Forging of Metallic Glass Matrix Composites", JOM, Dec. 2009, vol. 61, No. 12, pp. 11-17, plus cover.

Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.

Hu et al., "Crystallization Kinetics of the $Cu_{47.5}Zr_{74.5}Al_5$ Bulk Metallic Glass under Continuous and Iso-thermal heating", Applied Mechanics and Materials, Sep. 8, 2011, vols. 99-100, pp. 1052-1058, doi:10.4028/www.scientific.net/AMM.99-100.1052.

Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97, doi:10.1016/j.scriptamat.2005.03.005.

Huang et al., "Fretting wear behavior of bulk amorphous steel", Intermetallics, Jun. 12, 2011, vol. 19, pp. 1385-1389, doi:10.1016/j.intermet.2011.04.014.

Inoue et al., "Cobalt-based bulk glassy alloy with ultrahigh strength and soft magnetic properties", Nature Materials, Oct. 21, 2003, vol. 2, pp. 661-663, doi:10.1038/nmat982.

Inoue et al., "Development and applications of late transition metal bulk metallic glasses", Bulk Metallic Glasses, pp. 1-25, 2008.

Inoue et al., "Developments and applications of bulk metallic glasses", Reviews on Advanced Materials Science, Feb. 28, 2008, vol. 18, pp. 1-9.

Inoue et al., "Preparation of 16 mm Diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267, doi.10.1016/j.actamat.2010.11.027.

Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.

Qiao et al., "Metallic Glass Matrix Composites", Materials Science and Engineering, Feb. 2016, vol. 100, pp. 1-69, http://dx.doi.org.10.10163/jmser.2015.12.001.

Ramamurty et al., "Hardness and Plastic Deformation in A Bulk Metallic Glass", Acta Materialia, Feb. 2005, vol. 53, pp. 705-717, doi:10.1016/j.actamat.20004.10.023.

Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.

Roberts, "Developing and Characterizing Bulk Metallic Glasses for Extreme Applications", XP055731434, Retrieved from the Internet (Dec. 16, 2013) URL:https://thesis.library.caltech.edu/8049/141/Scott_Roberts_thesis_2013_Complete_ Thesis. pdf [retrieved on Sep. 17, 2020].

Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.

Sanders et al., "Stability of Al-rich glasses in the Al—La—Ni system", Intermetallics, 2006, vol. 14, pp. 348-351, doi:10.1016/j.intermet.2005.06.009.

Schuh et al., "A Survey of Instrumented Indentation Studies on Metallic Glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.

Shen et al., "3D printing of large, complex metallic glass structures", Materials and Design, Mar. 2017, vol. 117, pp. 213-222, http://dx.doi.org/10.1016/j.matdes.2016.12.087.

Shen et al., "Exceptionally High Glass-Forming Ability of An Fecocrmocby Alloy", Applied Physics, Apr. 5, 2005, vol. 86, pp. 151907-1-151907-3, DOI: 10.1063/1.1897426.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685, doi:10.1016/j.matdes.2011.03.011.

Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.

Sun et al., "Fiber metallic glass laminates", J. Mater. Res., Dec. 2010, vol. 25, No. 12, pp. 2287-2291, DOI: 10.1557/JMR.2010.0291.

Sundaram et al., "Mesoscale Folding, Instability, and Disruption of Laminar Flow in Metal Surfaces", Physical Review Letters, Sep. 7, 2012, vol. 109, p. 106001-1-106001-5, DOI: 10.1103/PhysRevLett.109.106001.

Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.

Tam et al., "Abrasion Resistance of Cu Based Bulk Metallic Glasses", Journal of Non-Crystalline Solids, Oct. 18, 2004, vol. 347, pp. 268-272, doi:10.1016/j.noncrysol.2004.09.008.

Tam et al., "Abrasive Wear of Cu60zr30ti10 Bulk Metallic Glass", Materials Science and Engineering, Apr. 1, 2004, vol. A384 pp. 138-142, doi:10.1016/j.msea.2004.05.73.

Tan et al., "Synthesis of La-based in-situ bulk metallic glass matrix composite", Intermetallics, Nov. 2002, vol. 10, Issues 11-12, pp. 1203-1205.

Tao et al., "Effect of Rotational Sliding Velocity on Surface Friction And Wear Behavior in Zr-Based Bulk Metallic Glass", Journal of Alloys and Compounds, Mar. 4, 2010, vol. 492, pp. L36-L39, doi:10.1016/j.jallcom.2009.11.113.

Tao et al., "Influence of Isothermal Annealing on The Micro-Hardness And Friction Property in Cuzral Bulk Metallic Glass", Advanced Materials Research, Jan. 1, 2011, vols. 146-147, pp. 615-618, doi:10.4028/www.scientific.net/AMR.146-147.615.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in Studying The Fatigue Behavior of Zr-Based Bulk-Metallic Glasses And Their Composites", Intermetallics, Mar. 6, 2009, vol. 17, pp. 579-590, doi:10.1016/j.intermet.2009.01.017.

Whang et al., "Microstructures and age hardening of rapidly quenched Ti—Zr—Si alloys", Journal of Materials Science Letters,1985, vol. 4, pp. 883-887.

Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.

(56) References Cited

OTHER PUBLICATIONS

Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.
Wu et al., "Effects of Environment on The Sliding Tribological Behaviors of Zr-Based Bulk Metallic Glass", Intermetallics, Jan. 27, 2012, vol. 25, 115-125, doi:10.1016/j.intermet.2011.12.025.
Wu et al., "Formation of Cu—Zr—Al bulk metallic glass composites with improved tensile properties", Acta Materialia 59, Feb. 19, 2011, pp. 2928-2936, doi:10.1016/j.actamat.2011.01.029.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yao et al., "Fe-Based Bulk Metallic Glass with High Plasticity", Applied Physics Letters, Feb. 5, 2007, vol. 90, 061901, doi: 10.1063/1.2437722.
Yin et al., "Microstructure and Mechanical Properties of A Spray-Formed Ti-Based Metallic Glass Former Alloy", Journal of Alloys and Compounds, Jan. 25, 2012, vol. 512, pp. 241-245, doi:10.1016/j.jallcom.2011-09.074.
Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.
Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.
Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.
Zhang et al., "Robust Hydrophobic Fe-Based Amorphous Coating by Thermal Spraying", Applied Physics Letters, Sep. 20, 2012, vol. 101, p. 121603-1-121603-4.
Zhang et al., "Wear Behavior of a Series of Zr-Based Bulk Metallic Glasses", Materials Science and Engineering, Feb. 25, 2008, vol. A475, pp. 124-127, doi: 10.1016/j.msea.2007.05.039.
Zheng et al., "Processing and Behavior of Fe-Based Metallic Glass Components via Laser-Engineered Net Shaping", Metallurgical and Materials Transactions A, 40A, 1235-1245, DOI: 10.1007/s11661-009-9828-y.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.
Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptamat.2009.11.018.
Zhuo et al., "Ductile Bulk Aluminum-Based Alloy with Good Glass-Forming Ability and High Strength", Chinese Physics Letters, 2009, vol. 26, No. 6, p. 066402-1-066402-4.
Zhuo et al., "Spray Formed Al-Based Amorphous Matrix Nanocomposite Plate", Journal of Alloys and Compounds, Mar. 1, 2011, vol. 509, pp. L169-L173, doi:10.1016/j.jallcom.2011.02.125.
Johnson et al., "Quantifying the Origin of Metallic Glass Formation", Nature Communications, Jan. 20, 2016, vol. 7, 10313, 7 pgs., doi: 10.1038/ncomms10313.
Jung et al., "Fabrication of Fe-based bulk metallic glass by selective laser melting: A parameter study", Materials and Design, Jul. 30, 2015, vol. 86, pp. 703-708, http://dx.doi.org/10.1016/j.matdes.2015.07.145.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim et al., "Amorphous Phase Formation of Zr-Based Alloy Coating by HVOF Spraying Process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96, doi: 10.4028/www.scientific.net/JMNM.24-25.93.
Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.
Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307, doi:10.1016/j.scriptamat.2011.04.037.
Kim et al., "Weldability of $Cu_{54}Zr_{22}Ti_{18} Ni_6$ bulk metallic glass by ultrasonic welding processing", Materials Letters, May 17, 2014, vol. 130, pp. 160-163, http://dx.doi.org/10.1016/j.matlet.2014.05.056.
Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.
Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.
Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/jintermet.2013.03.017.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326, doi:10.1016/j.msen.2003.10.086.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476, doi: 10.1002/adma.201002148.
Kumar et al., "Embrittlement of Zr-based Bulk Metallic Glasses", Science Direct, Acta Materialia, 2009, vol. 57, pp. 3572-3583, available online May 11, 2009, doi:10.1016/j.actamat.2009.04.16.
Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.
Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.
Launey et al., "Solution to The Problem of The Poor Cyclic Fatigue Resistance of Bulk Metallic Glasses", PNAS Early Edition, pp. 1-6, Jan. 22, 2009, www.pnas.org/cgi/doi/10.1073/pnas.0900740106., Jan. 22, 2009.
Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.
Lee et al., "Nanomechanical properties of embedded dendrite phase and its influence on inelastic deformation of $Zr_{55}Al_{10}Ni_5Cu_{30}$ glassy

(56) References Cited

OTHER PUBLICATIONS alloy", Materials Science and Engineering A, Mar. 25, 2007, vol. 375, pp. 945-948, doi:10.1016/j.msea.2006.02.014.
Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.
Li et al., "Wear Behavior of Bulk $Zr_{41}Ti_{14}Cu_{12.5}Ni_{10}Be_{22.5}$ Metallic Glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.
Lin et al., "Designing a toxic-element-free Ti-based amorphous alloy with remarkable supercooled liquid region for biomedical application", Intermetallics, Jul. 9, 2014, vol. 55, pp. 22-27, http://dx.doi.org/10.1016/j.intermet.2014.07.003.
List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.
Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.
Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.
Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi:10.1016/j.jallcom.2009.04.086.
Liu et al., "Sliding Tribological Characteristics of a Zr-based Bulk Metallic Glass Near the Glass Transition Temperature", Tribol. Lett., Jan. 29, 2009, vol. 33, pp. 205-210.
Liu et al., "Wear Behavior of A Zr-Based Bulk Metallic Glass and Its Composites", Journal of Alloys and Compounds, May 5, 2010, vol. 503, pp. 138-144, doi:10.1016/j.jallcom.2010.04.2170.
Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.org/10.1016/j.jnoncrysol.2017.01.038.
Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.
Ma et al., "Wear Resistance of Zr-Based Bulk Metallic Glass Applied in Bearing Rollers", Materials Science and Engineering, May 4, 2004, vol. A386, pp. 326-330.
Maddala et al., "Effect of Notch Toughness and Hardness on Sliding Wear of $Cu_{50}hf_{41.5}a_{18.5}$ Bulk Metallic Glass", Scripta Materialia, Jul. 6, 2011, vol. 65, pp. 630-633, doi:10.1016/j.scriptamat.2011.06.046.
Madge, "Toughness of Bulk Metallic Glasses", Metals, Jul. 17, 2015, vol. 5, Issue 3, pp. 1279-1305, ISSN 2075-4701, doi:10.3390/met5031279.
Mahbooba et al., "Additive manufacturing of an iron-based bulk metallic glass larger than the critical casting thickness", Applied Materials Today, Feb. 27, 2018, vol. 11, pp. 264-269, https://doi.org/10.1016/j.apmt.2018.02.011.
Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.
Ni et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.
Nishiyama et al., "Recent progress of bulk metallic glasses for strain-sensing devices", Materials Science and Engineering: A, Mar. 25, 2007, vols. 449-451, pp. 79-83, doi:10.1016/j.jmsea.2006.02.384.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.
Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.
Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.
Pauly et al., "Processing Metallic Glasses by Selective Laser Melting", Materials Today, Jan./Feb. 2013, vol. 16, pp. 37-41 http://dx.org/10.1016/j.mattod.2013.01.018.
Pauly et al., "Transformation-mediated ductility in CuZr-based bulk metallic glasses", Nature Materials, May 16, 2010, vol. 9, Issue 6, pp. 473-477, DOI:10.1038/NMAT2767.
Ponnambalam et al., "Fe-Based Bulk Metallic Glasses with Diameter Thickness Larger Than One Centimeter", J Mater Res., Feb. 17, 2004. vol. 19; pp. 1320-1323, DOI: 10.1557/JMR.2004.0176.
Porter et al., "Incorporation of Amorphous Metals into MEMS for High Performance and Reliability", Rockwell Scientific Company, Final Report, Nov. 1, 2003, 41 pgs.
Prakash et al., "Sliding Wear Behavior of Some Fe-, Co-and Ni-Based Metallic Glasses During Rubbing Against Bearing Steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi:10.1016/j.msea.2010.08.055.
Extended European Search Report for European Application No. 14889035.3, Search completed Dec. 4, 2017, dated Dec. 13, 2017, 10 Pgs.
Extended European Search Report for European Application No. 18806700.3, Search completed Oct. 20, 2020, dated Oct. 28, 2020, 7 Pgs.
Extended European Search Report for European Application No. 18809486.6, Search completed Sep. 30, 2030, dated Oct. 12, 2020, 7 Pgs.
International Preliminary Report on Patentability for International Application PCT/US2018/035813, Report dated Dec. 3, 2019, dated Dec. 12, 2019, 9 Pgs.
International Preliminary Report on Patentability for International Application PCT/US2013/047950, issued Dec. 31, 2014, dated Jan. 8, 2015, 7 Pgs.
International Preliminary Report on Patentability for International Application PCT/US2013/050614, issued Jan. 20, 2015, dated Jan. 29, 2015, 9 Pgs.
International Preliminary Report on Patentability for International Application PCT/US2014/033510, issued Oct. 12, 2016, dated Oct. 20, 2016, 9 Pgs.
International Preliminary Report on Patentability for International Application PCT/US2014/056615, issued Mar. 22, 2016, dated Mar. 31, 2016, 11 Pgs.
International Preliminary Report on Patentability for International Application PCT/US2018/022020, Report issued Sep. 10, 2019, dated Sep. 19, 2019, 10 Pgs.
International Preliminary Report on Patentability for International Application PCT/US2018/034481, Report issued Nov. 26, 2019, dated Dec. 5, 2019, 17 Pgs.
International Preliminary Report on Patentability for International Application PCT/US2018/034924, Report issued Nov. 26, 2019, dated Dec. 5, 2019, 13 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.

(56) References Cited

OTHER PUBLICATIONS

International Search Report and Written Opinion for International Application No. PCT/US2018/034924, Search completed Sep. 18, 2018, dated Sep. 19, 2018, 15 Pgs.
International Search Report and Written Opinion for International Application No. PCT/US2018/035813, Search completed Dec. 12, 2018, dated Dec. 12, 2018, 11 Pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive", Wikipedia, printed Feb. 20, 2014, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, p. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
Adharapurapu et al., "Fracture of Ti-Al3Ti metal-intermetallic laminate composites: Effects of lamination on resistance-curve behavior", Metallurgical and Materials Transactions A, Nov. 2005, vol. 36A, 3217-3236.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi: 10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi:10.1016/j.scriptamat.2005.09.051.
Bakkal, "Sliding tribological characteristics of Zr-based bulk metallic glass under lubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI:10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Berger, "A Survey of Additive Manufacturing Processes Applied on the Fabrication of Gears", 1st International Conference on Progress in Additive Manufacturing (Pro-AM 2014), May 26-28, 2014, pp. 315-320, doi: 10.3850/978-981-09-0446-3_010.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439, Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317, https://doi.org/10.1016/j.addma.2018.03.023.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Byrne et al., "Bulk Metallic Glasses", Science, Jul. 25, 2008, vol. 321, pp. 502-503, doi:10.1126/science.1158864.
Cadney et al., "Cold Gas Dynamic Spraying as A Method for Freeforming and Joining Materials", Science Direct, Surface & Coatings Technology, Mar. 15, 2008, vol. 202, pp. 2801-2806, available online Oct. 17, 2007, doi: 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Liu et al., "Effect of Minor Alloying Additions on Glass Formation in Bulk Metallic Glasses", Intermetallics 13 (2005) 415-418.
Park et al., "Enhancement of plasticity in Ti-rich Ti—Zr—Be—Cu—Ni bulk metallic glasses", Scripta Materialia 53 (2005) 1-6.

\* cited by examiner

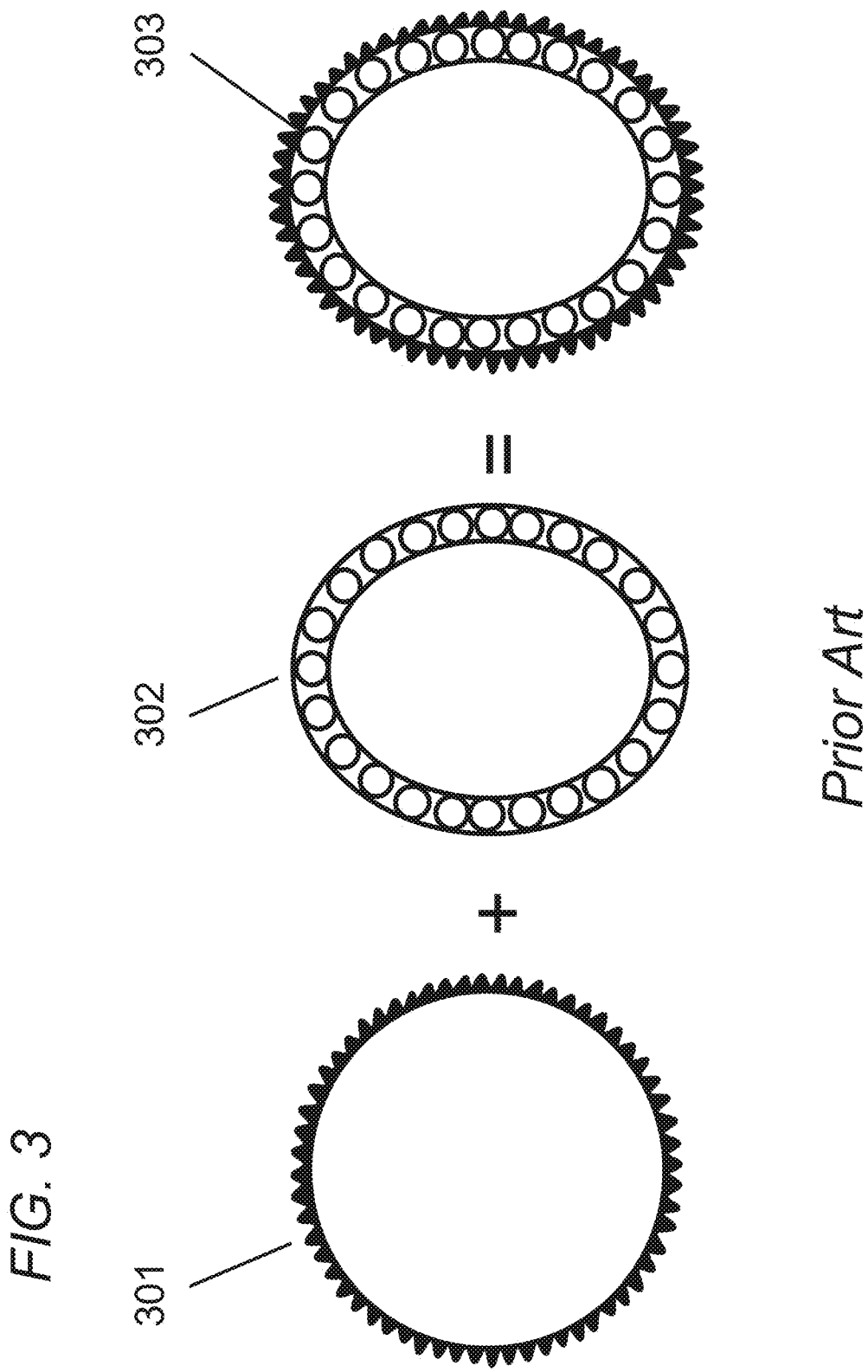
FIG. 3  *Prior Art*

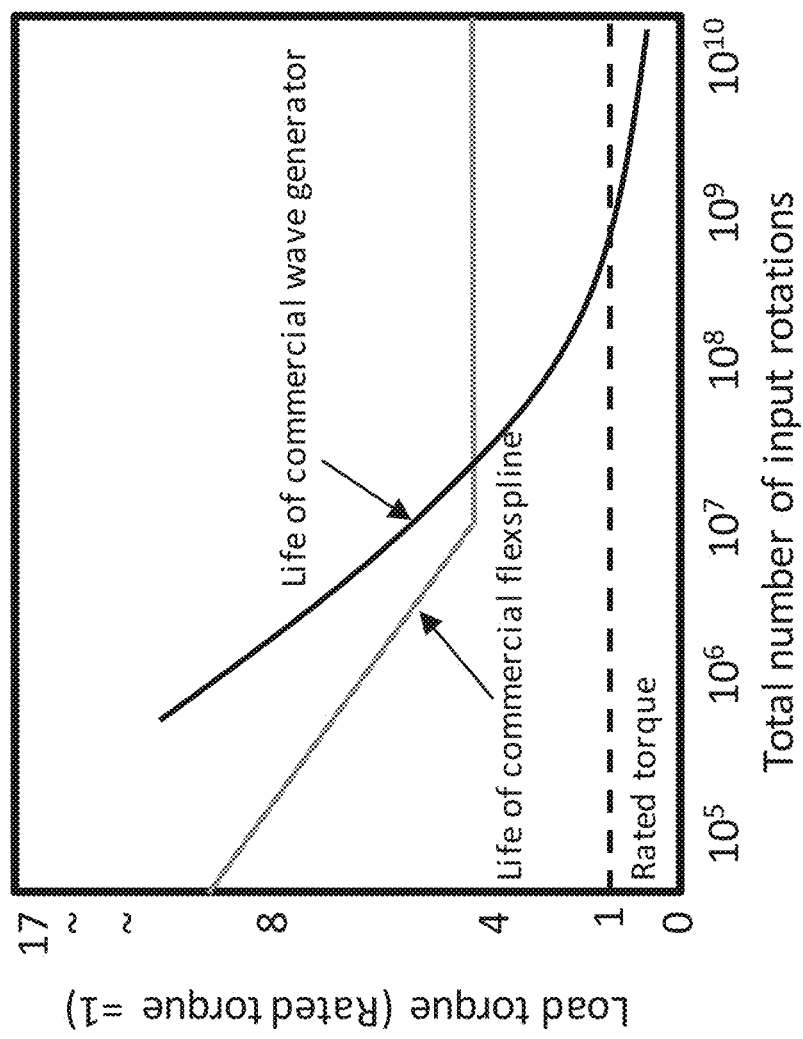
FIG. 5A  *Prior Art*

*Prior Art*

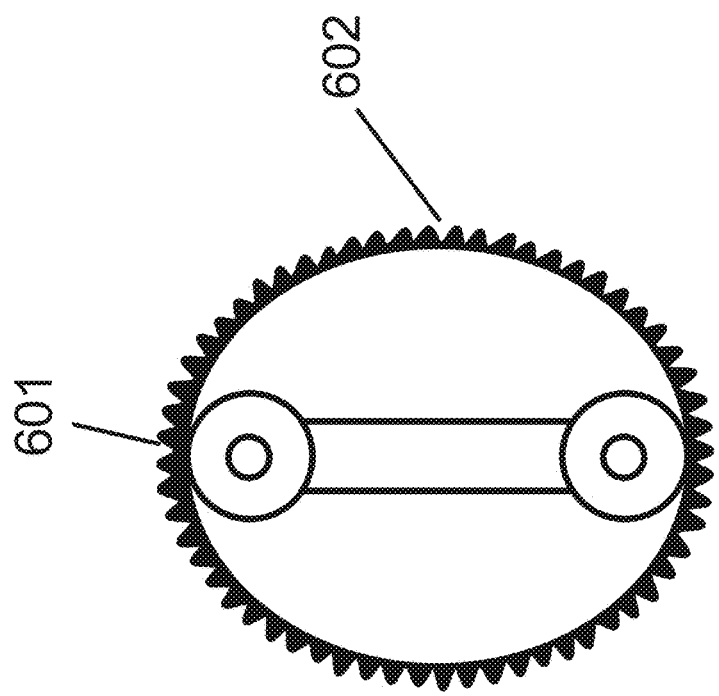
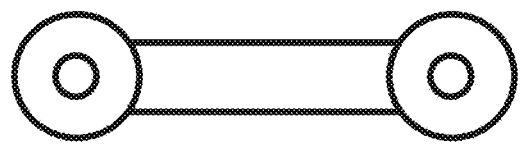
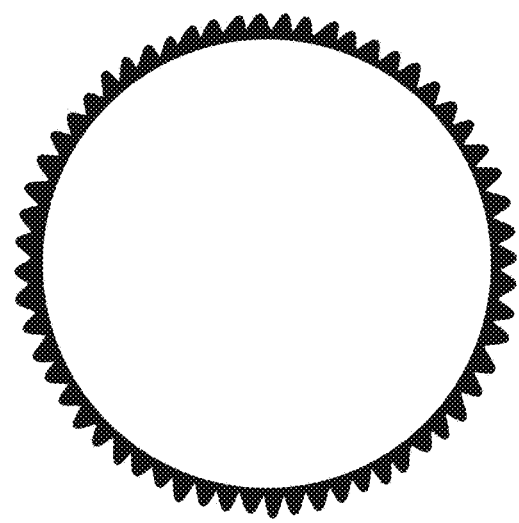
FIG. 6

FIG. 9

Replace the wave generator of a strain wave gear with conventional circular bearings that form an ellipse either statically or through adjustment → Change the shape, size, number, type and location of the bearings so that the wave generator fails at a similar lifetime as a low cost flexspline → If required, adjust the shape of the wave generator to change the performance of the strain wave gear → Combine low cost manufacturing of flexsplines with low cost wave generators to reduce the cost of the strain wave gear

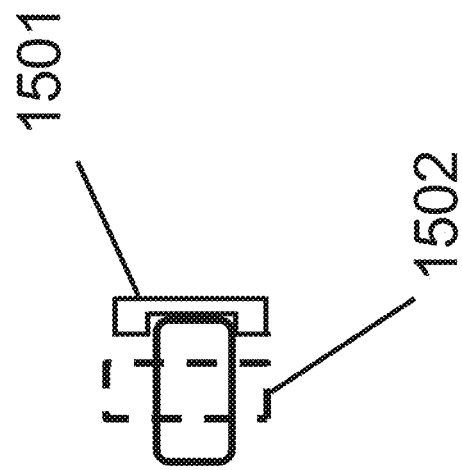
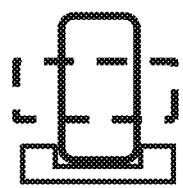
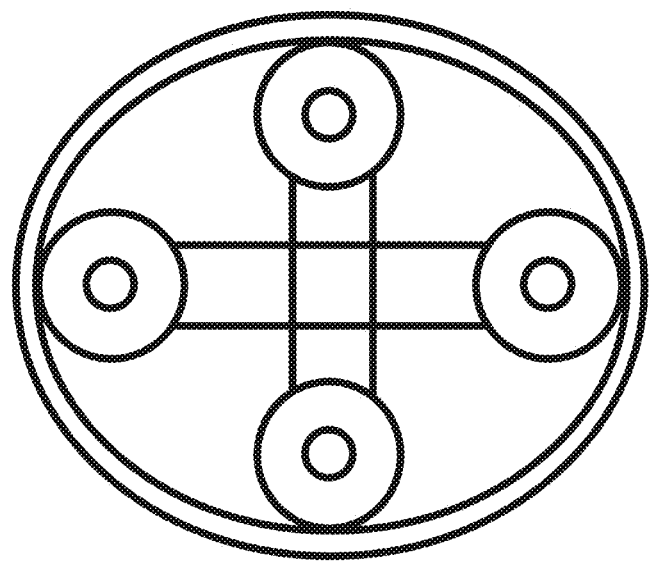
FIG. 15B
FIG. 15A

LOW COST WAVE GENERATORS FOR METAL STRAIN WAVE GEARS AND METHODS OF MANUFACTURE THEREOF

CROSS-REFERENCE TO RELATED APPLICATIONS

The current application claims the benefit of and priority under 35 U.S.C. § 119 (e) to U.S. Provisional Patent Application No. 62/811,765 entitled "Design Of Low Cost Wave Generator for Metal Strain Wave Gearing" filed Feb. 28, 2019. The disclosure of U.S. Provisional Patent Application No. 62/811,765 is hereby incorporated by reference in its entirety for all purposes.

GOVERNMENT SPONSORED RESEARCH

This invention was made with government support under Grant Number 80NM0018D004, awarded by NASA (JPL). The government has certain rights in the invention.

FIELD OF THE INVENTION

The present invention generally relates to low cost wave generators for metal strain wave gears; and more particularly to metal strain wave gears incorporating circular bearings, and their methods of manufacture.

BACKGROUND OF THE INVENTION

Harmonic drives (HDs) are used widely in robotics as a method for achieving high gear reductions and for driving force transmissions. HDs were developed to take advantage of the elastic dynamics of metals, particularly the expansion of a metal ring to engage gear teeth without exceeding the elastic limit of the ring, which would cause permanent (i.e., plastic) deformation. The HD is made of three components: a wave generator, a flexspline (a.k.a. an inner race), and a circular spline (a.k.a. an outer race) (FIG. 1). The wave generator is an elliptical cam with small ball-bearings built into the outer circumference and is usually attached to the input shaft (FIG. 2). The flexspline, is a thin metal cup with external gear teeth and contains a diaphragm at the bottom of the cup for connecting to an output shaft. The circular spline is a steel ring with internal teeth and is usually fixed to a casing. The circular spline has two more teeth than the flexspline and the diameter of the circular spline is slightly larger than the flexspline such that if they were put together without the wave generator, they would be concentric and their teeth wouldn't touch.

In operation, the flexspline is deflected by the motion of the elliptical wave generator, which forces the teeth at the major axis of the ellipse to engage with the circular spline (while the teeth at the minor axis are completely disengaged). When the wave generator completes 180 degrees of motion, the flexspline has moved by one tooth relative to the circular spline. The movement of the flexspline is the output power.

HDs have many characteristics that make their use critical in robotics applications. They have high-speed reduction ratios of 1/30 to 1/320, which provides high efficiency gearing without using complex mechanisms. HDs operate with nearly zero backlash and have extremely high precision. They have small numbers of components and assemble easily and they can generally be small-sized and lightweight. HDs have high torque capacity due to the use of fatigue resistance steel in the flexspline and they have high efficiency.

BRIEF SUMMARY OF THE INVENTION

Methods and systems for designing low cost wave generator for metal strain wave gearing are illustrated.

Many embodiments are directed to a wave generator for a metal strain wave gear comprising, at least four circular bearings, where the at least four circular bearings are disposed within a circular flexspline to form an elliptical shape, where at least two circular bearings are on a first support feature, where the first support feature has a length equal to the major axis of the elliptical shape, where at least one of the at least two circular bearings is disposed on a first end of the first support feature and a second of the at least two circular bearings is disposed on a second end of the first support feature, where the first support feature is either an arm or a solid block, where at least two further circular bearings are disposed on a second support feature, where the second support feature has a length equal to the minor axis of the elliptical shape, where at least one of the two further circular bearings is disposed on a first end of the second support feature and a second of the at least two circular bearings is disposed on a second end of the second support feature, where the second support feature is either an arm or a solid block and, where the circular bearings are configured such that at least four points of contact are maintained between the wave generator and the flexspline.

In many other embodiments, the wave generator the wave generator for a metal strain wave gear comprising at least eight circular bearings, where the at least eight circular bearings are disposed within a circular flexspline to form an elliptical shape, where at least eight circular bearings are distributed on the circumference of the elliptical shape, where at least two circular bearings are on a first support arm, where at least one of the at least two circular bearings is disposed on a first end of the first support arm and a second of the at least two circular bearings is disposed on a second end of the first support arm, where at least two further circular bearings are on a second support arm, where at least one of the at least two further circular bearings is disposed on a first end of the second support arm and a second of the at least two further circular bearings is disposed on a second end of the second support arm, where at least two further circular bearings are on a third support arm, where at least one of the at least two further circular bearings is disposed on a first end of the third support arm and a second of the at least two further circular bearings is disposed on a second end of the third support arm, where at least the two further circular bearings are on a fourth support arm, where at least one of the two further circular bearings is disposed on a first end of the fourth support arm and a second of the at least two further circular bearings is disposed on a second end of the fourth support arm and, where the circular bearings are configured such that at least eight points of contact are maintained between the wave generator and the flexspline.

In still many embodiments, the circular bearings comprise roller bearings.

In yet many other embodiments, the circular bearings comprise ball bearings.

In still yet many other embodiments, the circular bearings comprise roller bearings and ball bearings.

In still many embodiments, the circular bearings comprise a metallic glass based material.

In yet many embodiments, the circular bearings comprise a ceramic material.

In still yet many other embodiments, the circular bearings comprise a steel material.

In still many other embodiments, the diameter of the circular bearings is less than one half of the length of the major axis of the elliptical shape.

In still yet many other embodiments, the support arm lengths are adjustable.

In yet many other embodiments, the adjustable support arms improve the fatigue performance of a bulk metallic glass-based flexspline by at least 10% compared to an elliptical wave generator.

In many other embodiments, the circular bearings are same sizes.

In other embodiments, the circular bearings are different sizes.

In still many other embodiments, the flexspline comprises a high temperature material, wherein the high temperature material comprises Inconel and tantalum.

In still yet other embodiments, the flexspline comprises a low temperature material, wherein the low temperature material comprises a metallic glass based material.

In still yet many embodiments, the flexspline comprises a high wear resistant alloy, wherein the high wear resistant alloy comprises a tool steel.

In yet many other embodiments, a thin flexible metal ring is disposed between the outside of the circular bearings and the inside wall of the flexspline and, where the ring is in constant contact with the flexspline during operation.

In still yet many other embodiments, the thin flexible metal ring has a first grooved surface to prevent from sliding off of the circular bearings and a second smooth surface to mate with the flexspline.

In still yet many other embodiments, the thin flexible metal ring comprises a metallic glass based material.

Various embodiments are directed to a wave generator for a metal strain wave gear comprising, at least eight circular bearings and, where each of the at least eight circular bearings are disposed on an outer circumference of a solid elliptical component.

In many embodiments, the circular bearings are connected to a solid elliptical component with bolts to allow for rotational motion without sliding off of the wave generator.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 3 illustrates a circular flexspline combined with an elliptical wave generator to form the inner two components of a strain wave gear, and the complete contact between the wave generator and the flexspline in accordance with the prior art.

FIG. 5A conceptually illustrates a conventional fatigue-life curve for a commercial strain wave gear in accordance with prior art.

FIG. 6 illustrates a wave generator replacement in accordance with embodiments with two circular bearings on a shaft with length equal to the major axes of the ellipse.

FIG. 9 illustrates a flow chart of the steps to design a low cost wave generator for metal strain wave gearing in accordance with embodiments.

FIG. 15A illustrates a top view of a wave generator using bearings and a flexible ring where the ring incorporates a groove to prevent slippage off of the wave generator in accordance with embodiments.

FIG. 15B illustrates side view of a wave generator using bearings and a flexible ring where the ring incorporates a groove to prevent slippage off of the wave generator in accordance with embodiments.

DETAILED DESCRIPTION OF THE INVENTION

Turning now to the drawings, low cost wave generators for metal strain wave gears, and methods of their manufacture, are described. In many embodiments, the elliptical wave generator is replaced with circular bearings. In some embodiments, at least four circular bearings are used where at least four points of contact are maintained between the wave generator and the flexspline during operation. Many embodiments describe different configurations of such circular bearings. Many other embodiments highlight that the positions of the circular bearings can be adjusted to impart more or less deformation to the flexspline. Various such embodiments incorporate different sizes of circular bearings on the major and minor axes of an ellipse. The type and number of circular bearings can also be adjusted according to embodiments to modify the efficiency and the torque of the strain wave gear in the wave generator. In many embodiments, the wave generator has adjustable arms. In some other embodiments, the circular bearings are connected to a solid component. In some other embodiments, a flexible metal ring is placed between the circular bearings and the inside wall of the flexspline. any embodiments use roller bearings, ball bearings, or combination of both. In many embodiments, ceramic bearings are used. In many other embodiments, metal bearings are used. Many embodiments reveal that the position and number of bearings can increase the life of a flexspline made from a brittle bulk metallic glass alloy.

Harmonic drives are one of the driving factors in the early formulation of spacecraft design because they limit the size of the spacecraft. Harmonic drives are also used very heavily on Jet Propulsion Lab rovers, including many that were integrated into the Mars Exploration Rovers (MER). Developing low cost harmonic drives or high performance drives is game-changing for future NASA missions and for terrestrial robotics.

Harmonic drives were developed to take advantage of the elastic dynamics of metals, particularly the expansion of a metal ring to engage gear teeth without exceeding the elastic limit of the ring, which would cause permanent (i.e. plastic) deformation. The harmonic drive is made of three components: a wave generator, a flexspline (a.k.a. an inner race), and a circular spline (a.k.a. an outer race).

Figure 1:
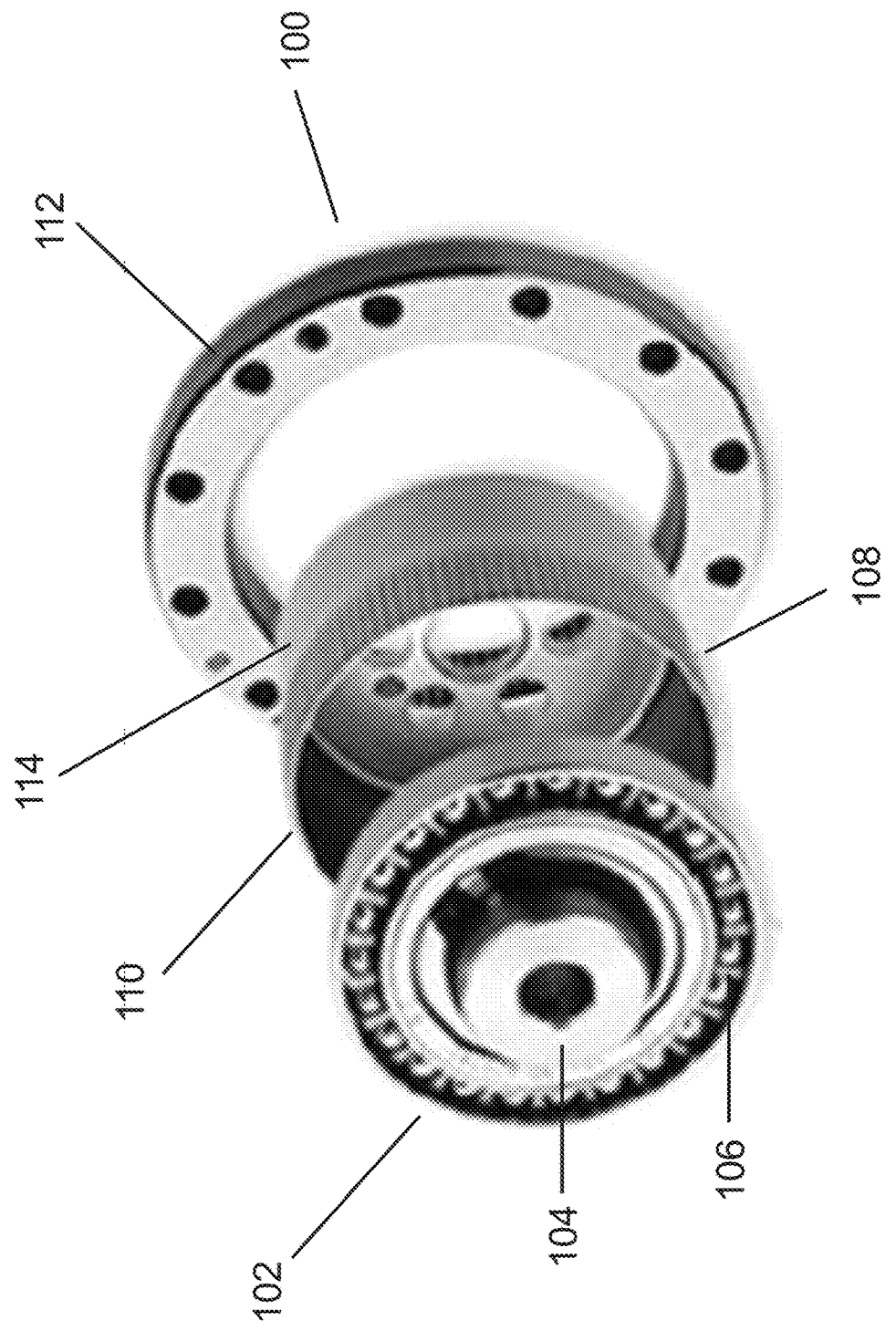
FIG. 1 illustrates a strain wave gear in accordance with the prior art.

FIG. 1 illustrates an exploded view of a typical strain wave gear that can be fabricated from BMG-based materials in accordance with embodiments of the invention. In particular, the strain wave gear 100 includes a wave generator 102, a flexspline 108, and a circular spline 112. The illustrated wave generator 102 includes a wave generator plug 104 and a ball bearing 106. Importantly, the wave generator plug 104 is elliptical in shape, and is disposed within the ball bearing 106 so that the ball bearing 106 to conforms to the elliptical shape. In this arrangement, the outer race of the ball bearing 106 can rotate relative to the wave generator plug 104. In the illustrated embodiment, the flexspline 108 is depicted as being in the shape of a cup; notably, the outer rim of the cup includes a set of gear teeth 110. In the illustration, the flexspline is fitted over the ball bearing, such that the outer rim of the flexspline conforms to the aforementioned elliptical shape. Note that in this arrangement, the ball bearing allows the flexspline to rotate relative to the wave generator plug. The circular spline, 112 is in the shape of a ring; importantly, the inner perimeter of the ring includes a set of gear teeth. Normally, there are more gear teeth on the circular spline 114 than on the flexspline 110. In many instances there are two more gear teeth on the circular spline 112 than on the flexspline 108. Typically, the flexspline 108 is fitted within the circular spline 112 such that the gear teeth of the flexspline 110 engage the gear teeth of the circular spline 114. Notably, because the gear teeth of the flexspline 110 conform to an elliptical shape, only the gear teeth proximate the major axis of the elliptical shape engage the gear teeth of the circular spline 114 in the usual case. Conversely, the gear teeth of the flex spline 110 that are proximate the minor axis of the elliptical shape are disengaged from the gear teeth of the circular spline 114. In many instances, 30% of the gear teeth of the flexspline 110 are engaged with the gear teeth of the circular spline 114. With this arrangement, the wave generator plug 104 can rotate in a first direction about the central axis of the elliptical shape, and thereby cause the flexspline 108 to rotate in a second opposite direction and at a different rate of rotation (generally slower) about the central axis of the elliptical shape. This can be achieved as the flexspline 108 is made of a flexible material that can accommodate the deflections that may result from the rotation of the wave generator plug 104.

The primary problem with current strain wave gear harmonic drives is the machining of the components, particularly the elliptical wave generator and the thin-walled flexspline. Much work has been done on low-cost manufacturing methods for producing the flexspline including through casting of bulk metallic glasses and metal additive manufacturing (also called 3D printing). (See e.g., U.S. Pat. No. 9,328,813 B2 to Hofmann et al., U.S. Pat. No. 10,151, 377 B2 to Hofmann et al., U.S. patent application Ser. No.

Figure 2A:
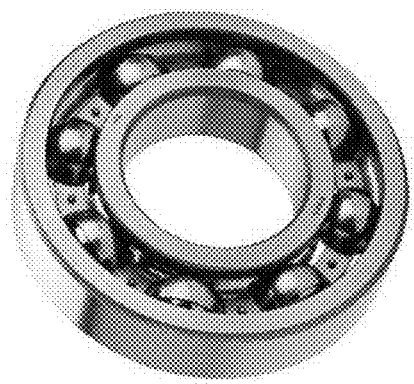
FIGS. 2A-2C illustrate low cost, commercially available ball bearings and roller bearings compared to the complex elliptical wave generator of a strain wave gear in accordance with the prior art.
Figure 2B:
Figure 2C:
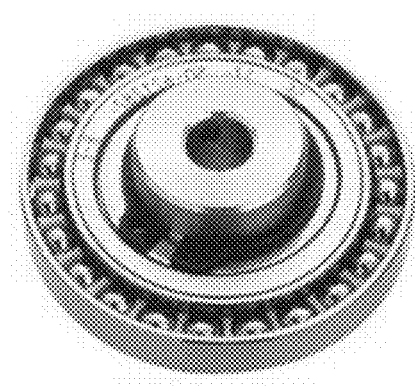

15/918,831 to Hofmann et al., U.S. patent application No. 62/811,798 to Hofmann et al.; the disclosures of which are hereby incorporated by reference.) Although significant progress has been made decreasing the manufacturing cost of the flexspline through the use of improved casting and 3D printing techniques, the overall cost of such strain wave gears is still large due to the complexity associated with manufacturing the elliptical wave generator that deforms the flexspline to engage the gearing (FIG. 2).

Currently, all wave generators for standard strain wave gears are manufactured by creating an elliptical bearing race with ball bearings that run in the race separated by spacers and then a thin steel race with a groove for the bearings on the inner side and a smooth outer surface 302 for engaging the flexspline 301 in FIG. 3. 303 shows complete contact between the wave generator and the flexspline. To manufacture the wave generator, precision grinding must be used to create the elliptical race and then precision machining must be used, in combination with grinding, to make the flexible outer band/race.

Figure 4:
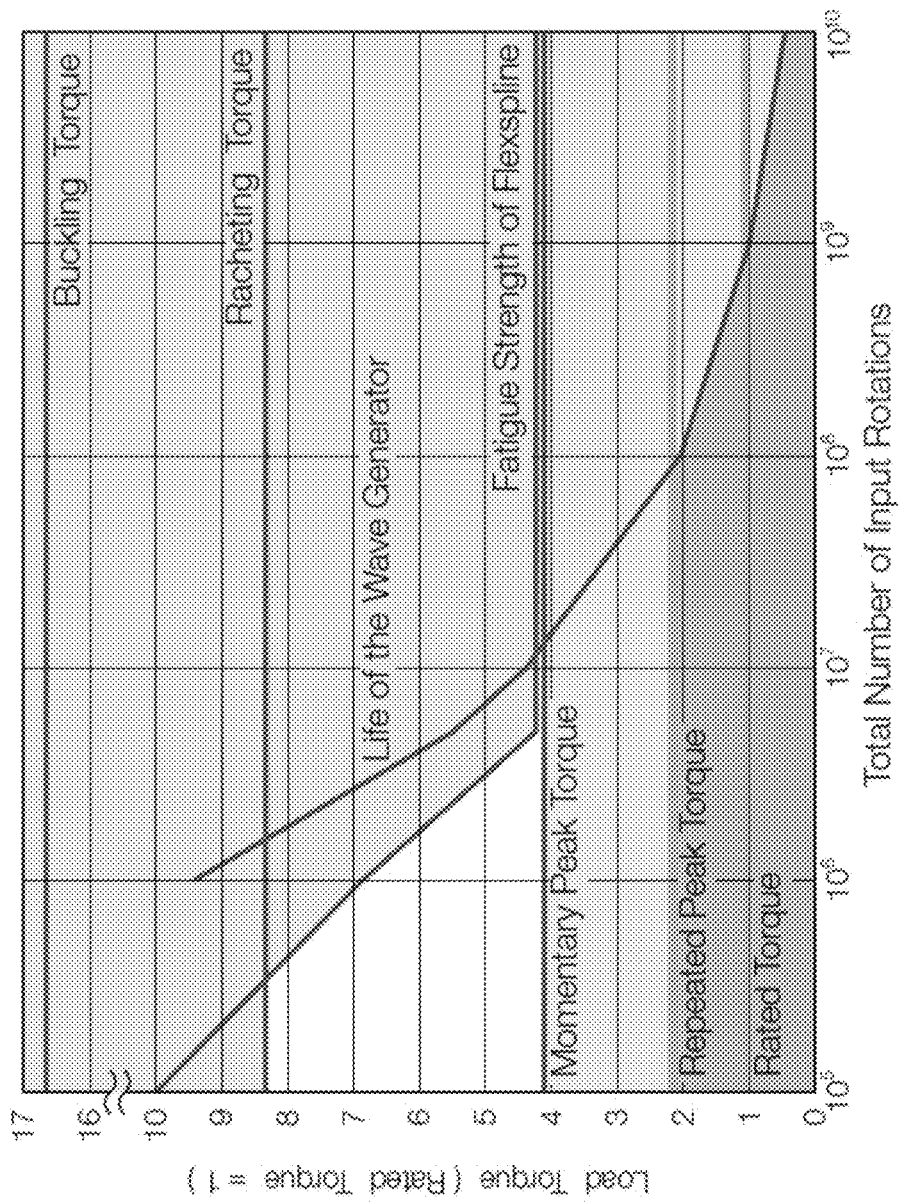
FIG. 4 illustrates the fatigue-life curve for commercial strain wave gears showing the predicted failure of the flexspline and the wave generator depending on the load above the rated torque, where the chart shows the various torque specifications relative to the rated torque, wherein the rated torque has been normalized to 1 for comparison in accordance with prior art.

The design of conventional wave generators for strain wave gearing has been optimized to maximum performance, including increasing the efficiency and the lifetime, while maximizing the running torque. For each strain wave gear, fatigue-life (also called S-N) curves (FIG. 4) are available that show the predicted failure mode depending on the torque the strain wave gear is operated at above the rated torque. Significant effort has been spent optimizing the machining of the steel flexspline such that the number of cycles until failure at various loads is in the millions. As such, the wave generator has been designed to fail at approximately 10% longer life than the flexspline at high torques and near the rated torque. Despite this conventional design principal, the wave generator is still the primary mode of failure (FIG. 5A).

Figure 5B:
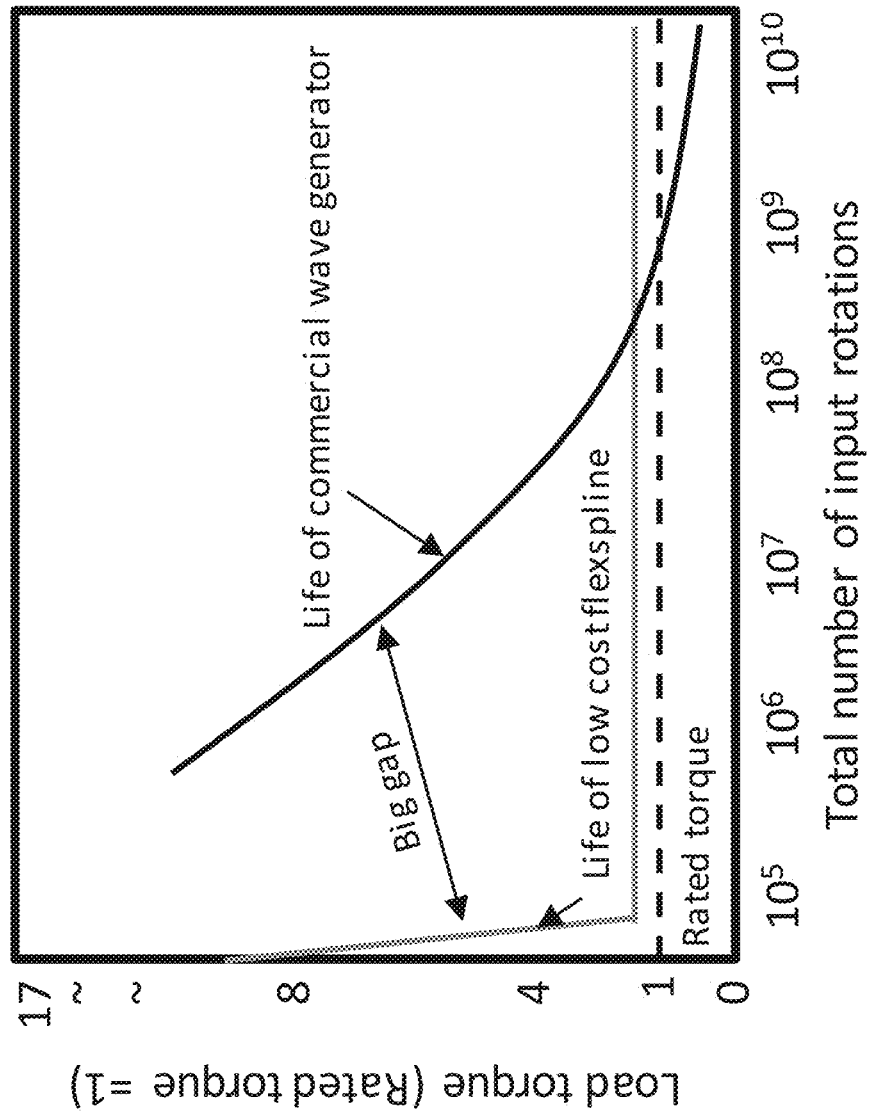
FIG. 5B conceptually illustrates a plot that shows when a low cost flexspline is substituted for the commercial flexspline, a large gap exists between the life of the flexspline and the life of the wave generator in accordance with prior art.

The issue with low cost manufacturing (or customizable manufacturing) of strain wave gears is that when new techniques are used to manufacture the flexspline, the number of cycles until failure dramatically decreases. For example, bulk metallic glass flexsplines tend to crack at a much lower number of cycles than machined steel. 3D printed metals have surface roughness, porosity and other defects that dramatically reduce their lifetimes. In cases where a low cost flexspline is utilized to decrease cost or change the operating conditions (like with cold capable flexsplines), the standard wave generator has a much longer life than the flexspline (FIG. 5B). This creates a condition where the flexspline will always fail prior to the wave generator and undue cost is incurred manufacturing the wave generator, when much lower performance characteristics would be tolerable. Unfortunately, the manufacturing associated with creating the elliptical wave generator cannot be easily modified to reduce its cost and the standard design is not easily adjustable.

Figure 5C:
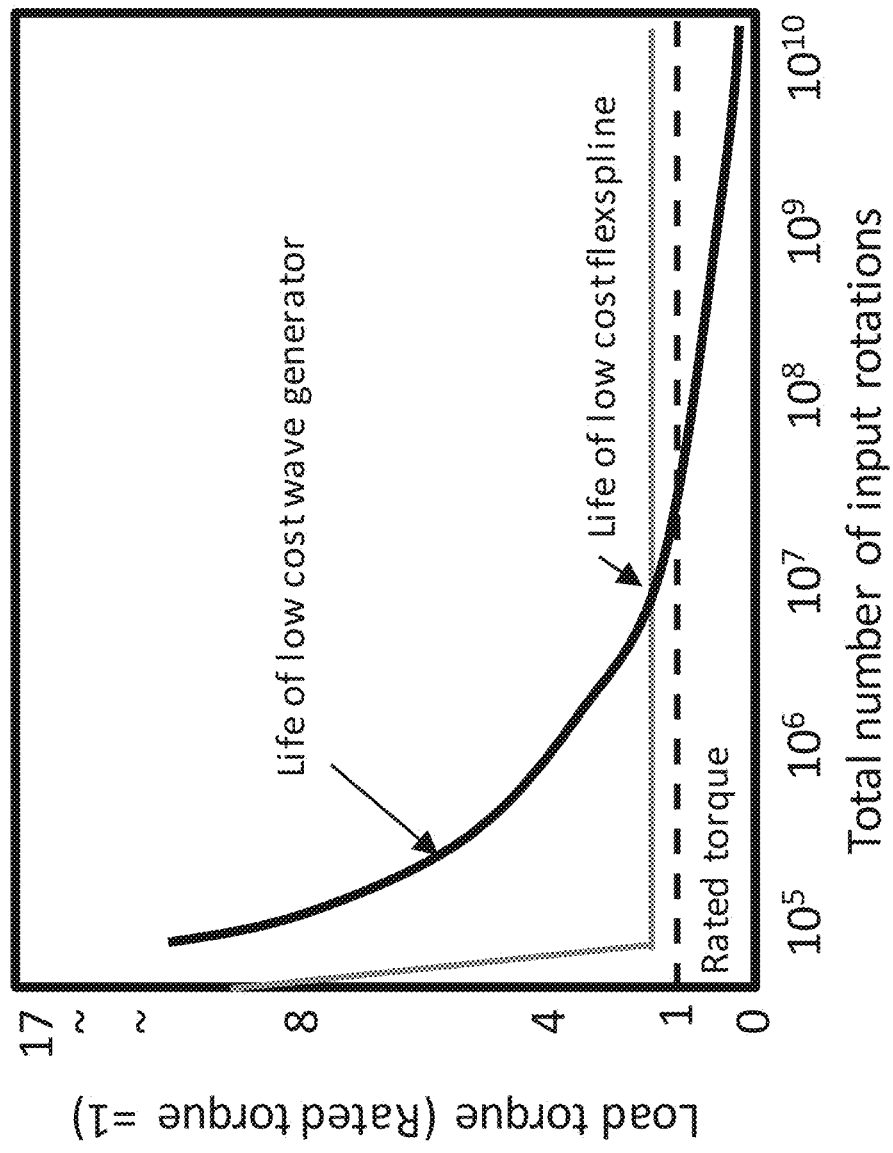
FIG. 5C conceptually illustrates a plot showing how a low cost wave generator, can be tailored to fail at similar life to a commercial flexspline in accordance with embodiments.

Many embodiments of the invention describe wave generators and methods of fabricating wave generators for low cost strain wave gears that are adjustable to any flexspline, and can also support brittle flexsplines and extend their life (FIG. 5C). Many embodiments include the fabrication of wave generators using commercially available bearings located on the circumference of an ellipse that can simultaneously deform the flexspline at the major axis of the ellipse but also provide support at the minor axis to prevent oscillations and to improve efficiency.

Embodiments of Wave Generators Implementing Novel Bearing Arrangements

Figure 7:
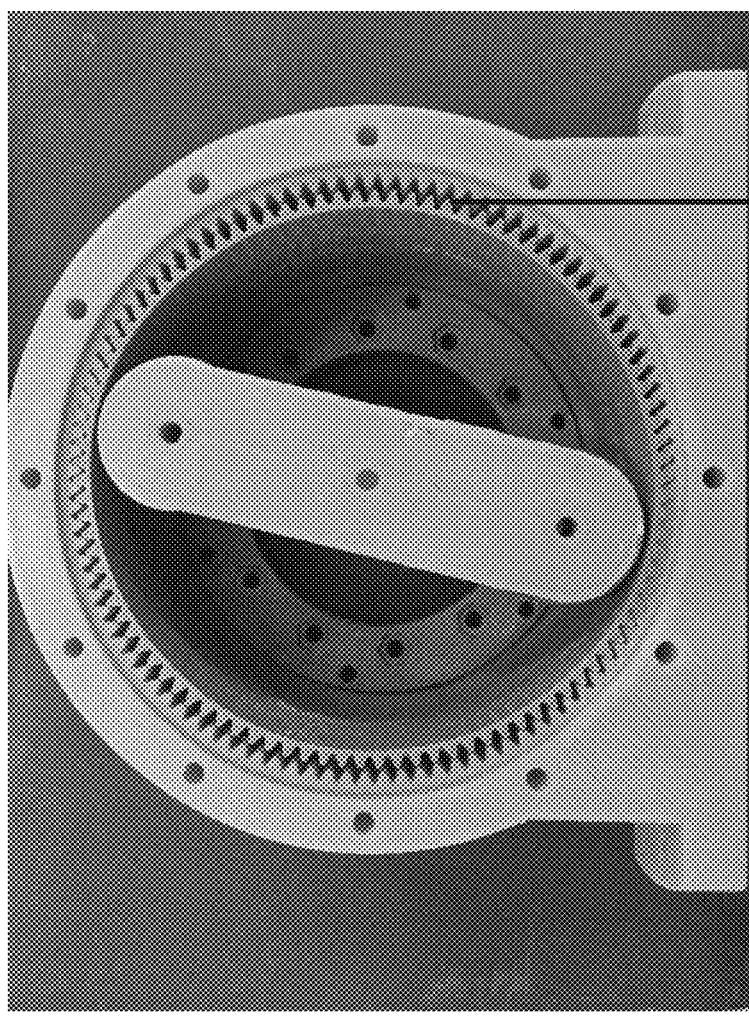
FIG. 7 illustrates 3D printed plastic flexsplines showing deformed flexsplines with two and three internal bearings making up the wave generator in accordance with embodiments.
Figure 8:
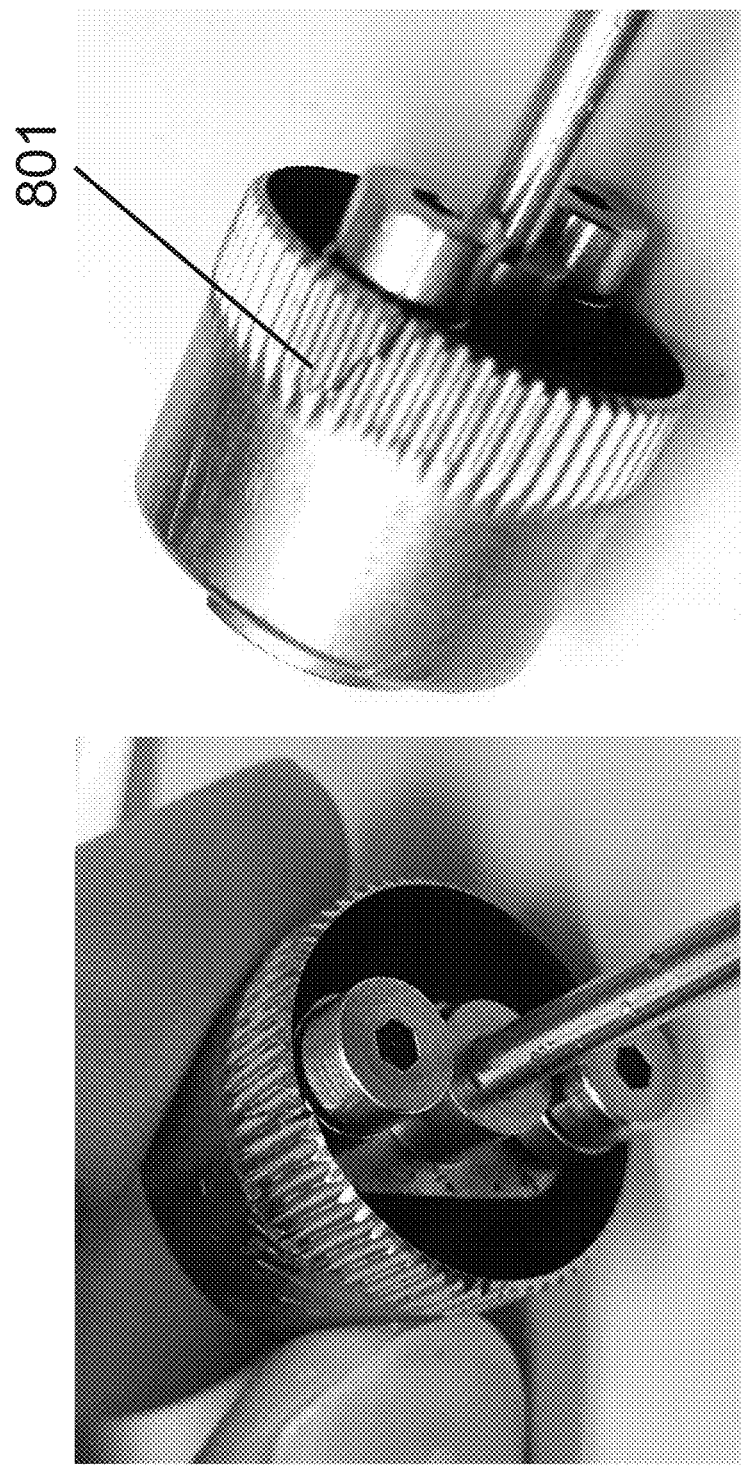
FIG. 8 illustrates cracks in the surface of a cast bulk metallic glass flexspline caused by a wave generator supporting the flexspline in only two locations in accordance with embodiments.

Although the difficulty in manufacturing wave generators for strain wave gears are well-known, substitutes for the standard complex wave generators have been difficult to develop. Various embodiments implement strain wave gears that replace the wave generator with conventional circular bearings disposed on one or more shafts. FIG. 6 depicts the replacement of a wave generator with two circular bearings on a shaft with length equal to the major axes of the ellipse. An issue with this design is that there are only two points of contact 601 between the wave generator and the flexspline resulting in a large area of unsupported flexspline wall 602. FIG. 7 shows examples of 3D printed plastic flexsplines, where circular bearings replace the wave generator. In FIG. 7, two circular bearings on a shaft structure create large unsupported flexspline regions 701. FIG. 8 shows a wave generator incorporating a two circular bearing design supporting the flexspline in only two locations. As shown, in such a design cracks 801 often develop in the surface of the cast bulk metallic glass flexspline.

As summarized in FIG. 9, wave generators according to many embodiments are fabricated using low-cost and commercially available ball bearings or roller bearings that are distributed around the circumference of an ellipse made through a solid support structure and that all rotate amongst their local axis to provide an elliptical motion to the flexspline. In various embodiments, at least four or more points of contact are disposed between the wave generator and the flexspline to prevent excessive flexing and oscillations that occur in brittle flexsplines which will decrease their lifetime.

As shown in FIGS. 10A to 10D, strain wave gears 1000 according to embodiments incorporate a novel wave generator that replaces the conventional wave generator and ball bearing element with a plurality of individual bearings 1002 disposed at opposite ends of elongated arms 1004. These bearing arms are disposed within a flexspline 1006, which itself can then be disposed in a conventional relation to a circular spline (not shown).

Figure 10B:
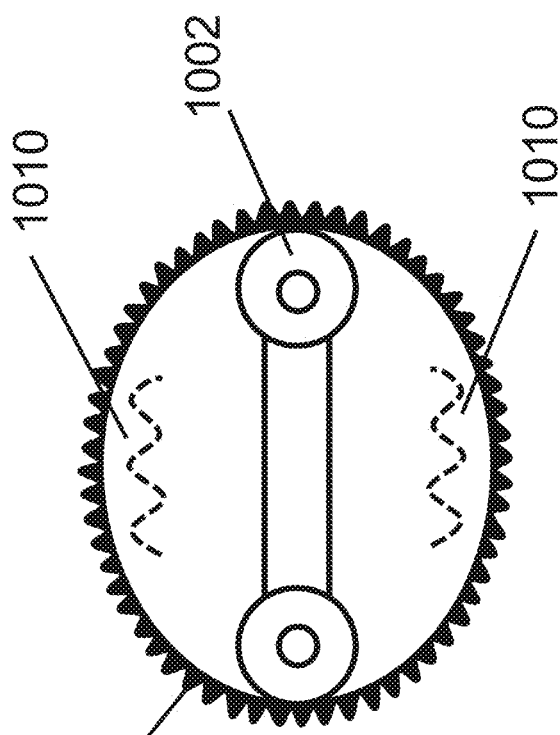
FIGS. 10A-10B illustrate the operation of a two bearing flexspline and the generation of oscillations in accordance with embodiments.
Figure 10A:
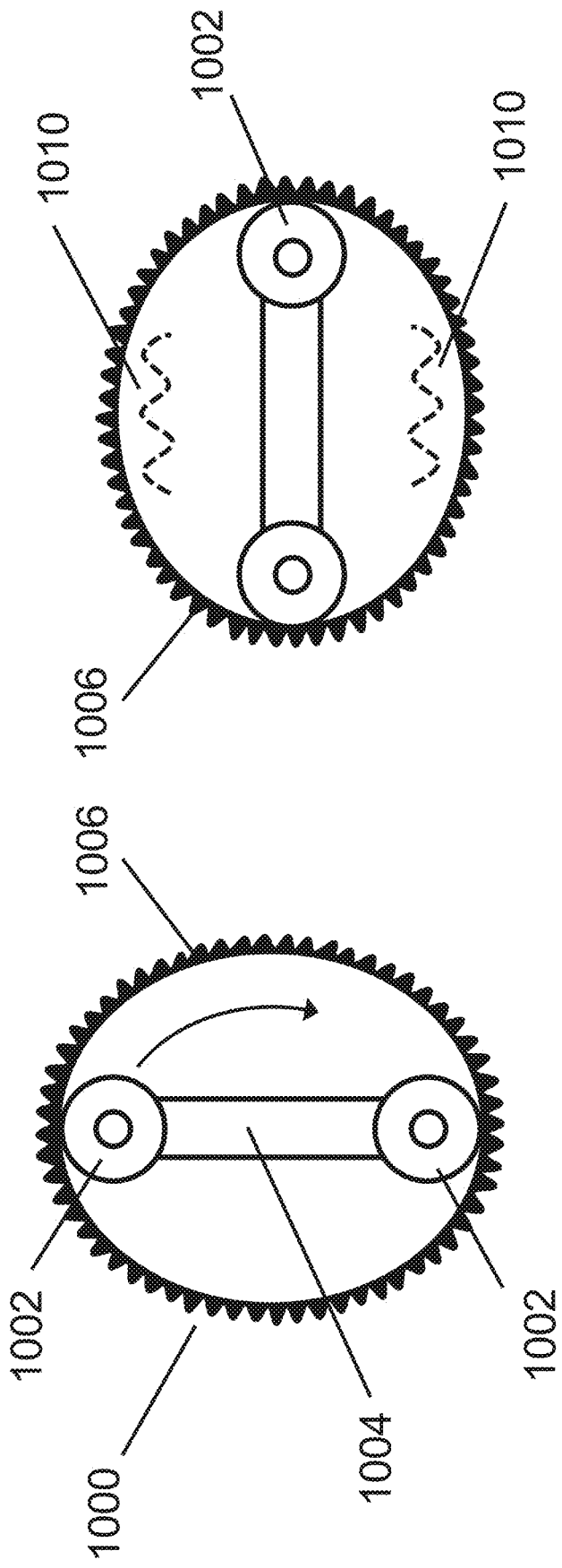
Figure 10C:
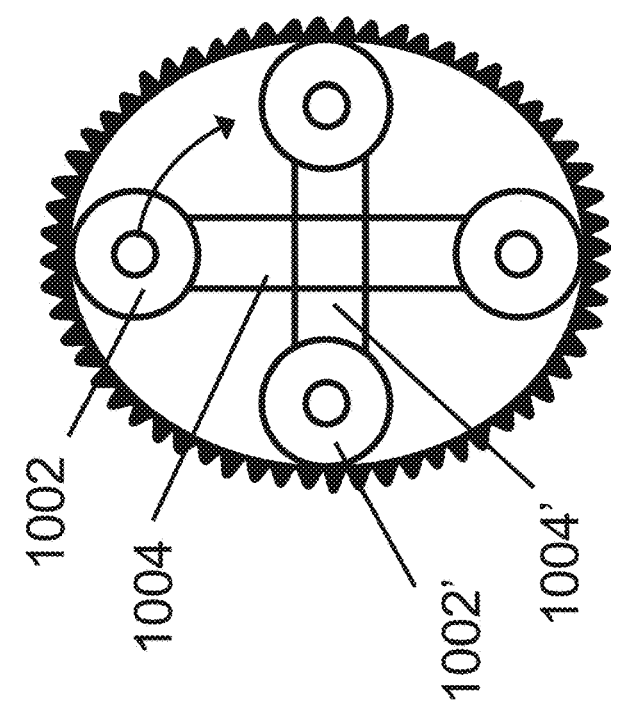
FIGS. 10C-10D illustrate the operation of a four bearing flexspline and the generation of oscillations in accordance with embodiments.

Turning the figures more specifically, FIGS. 10A and 10B show an elliptical wave generator comprising two bearings 1002 disposed on opposite ends of a single arm 1004. The length of the arm and the circular bearings equal the length of the long axis of the ellipse (FIG. 10A). The circular bearings 1002 can be ball bearings or roller bearings. When the arm rotates 90 degree clockwise (FIG. 10B), the unsupported regions 1010 of the flexspline 1006 oscillate. The oscillation leads to a decrease in the flexspline lifetime. Accordingly, many embodiments replace the wave generator with four or more bearings 1002 configured along opposite supporting arms to reduce the unsupported regions in the flexspline, thereby improving the flexspline performance, as shown in FIG. 10C. In embodiments incorporating a four bearing elliptical wave generator, every two bearings 1002 & 1002' are disposed on the opposite ends of a supporting arm 1004 & 1004'.

Figure 10D:
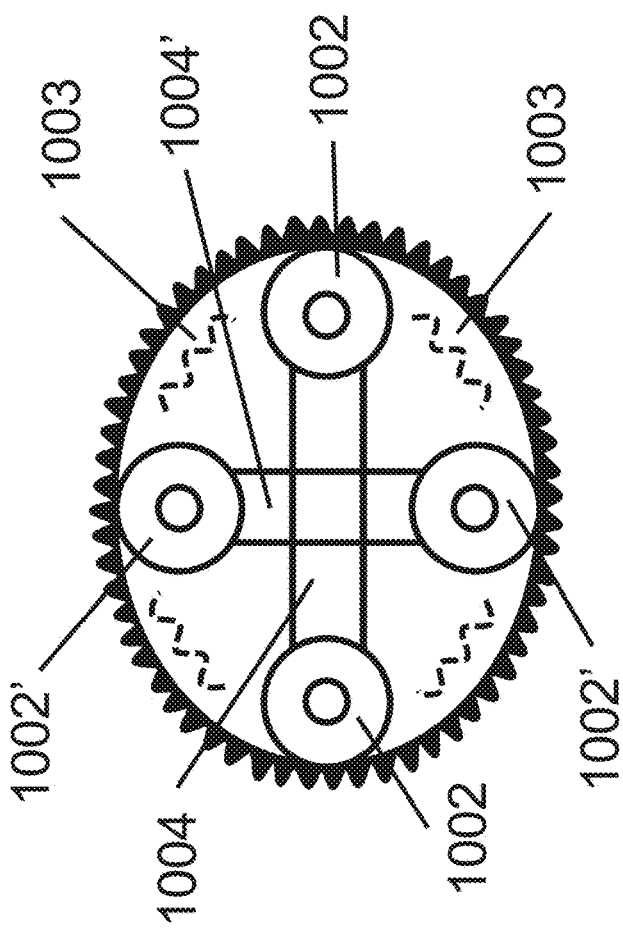

As shown in FIGS. 10C and 10D, in many such embodiments one of the support arms 1004 with two bearings has the length of the major axis of the ellipse, and the other support arm 1004' with two bearings has the length of the minor axis of the ellipse. During operation, the rotation of the wave generator (FIG. 10D) generates reduced flexspline oscillation compared to FIG. 10B.

Figure 11A:
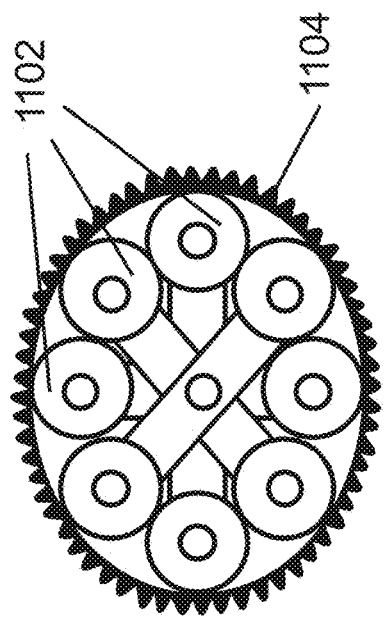
FIGS. 11A-11B illustrate a wave generator with 8 circular bearings making an ellipse, with each bearing located on adjustable arms in accordance with embodiments.
Figure 11B:
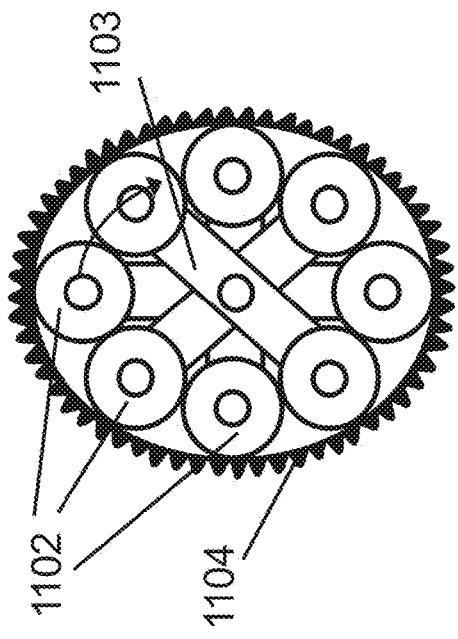
Figure 11C:
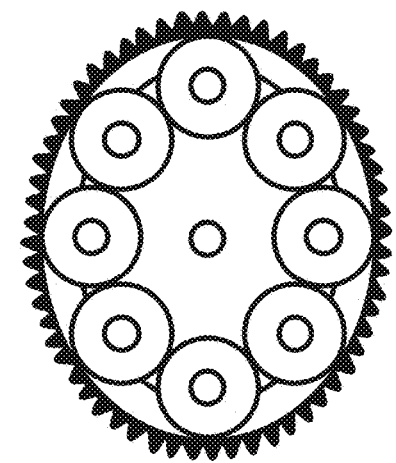
FIGS. 11C-11D illustrate a wave generator with 8 circular bearings making an ellipse, with each bearing located on a solid elliptical component in accordance with embodiments.
Figure 11D:
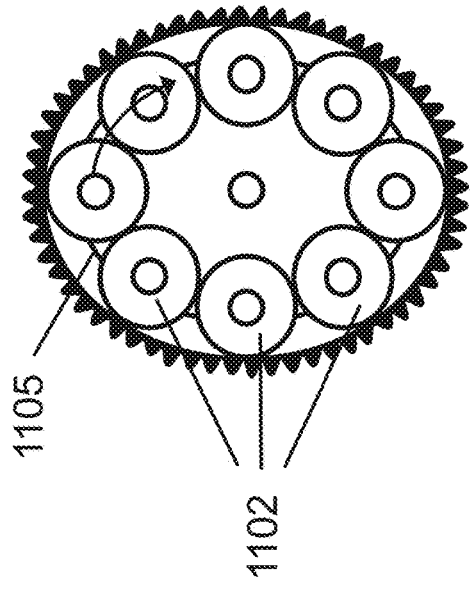

Although embodiments having two and four bearings on individual arms are shown in these figures, it will be understood that many other configurations of bearings may be implemented according to embodiments. For example various embodiments implement the bearings are located on pins and built into a solid piece. Some embodiments implement eight circular bearings as the wave generator, as depicted in FIGS. 11A and 11B. In some such embodiments, as shown the bearings 1102 may be disposed on adjustable arms 1103. As shown, the eight circular bearings 1102 make an ellipse. As described above, as the wave generator rotates, the eight bearings offer more supported area of the flexspline 1104. In various other embodiments, eight circular bearings 1102 may be located on a solid elliptical component 1105 instead of individual arms (FIG. 11C). Such a configuration enables the rotation of the wave generator while offering further support around the flexspline (FIG. 11D).

Substituting circular bearings, according to embodiments, in place of the elliptical wave generator bearing causes a decrease in the efficiency of the strain wave gear as a whole. However, the large cost savings associated with using commercially available, low cost bearings in place of the wave generator, allows for the production of low cost wave generators and strain wave gears such that they can be employed in a wider variety of industries.

By using multiple bearings (of the same or different sizes), adjustable locations, and even a thin flexible ring, fine tuning of the performance of the strain wave gear is possible. Moreover, by placing bearings on the ends of adjustable arms, in accordance with various embodiments, small modifications can be made to the length of the elliptical axis which can fine-tune the torque on the flexspline or normalize the torque of the flexspline in the case that some manufacturing error exists. For example, an adjustable wave generator can correct the error in a 3D printed flexspline that is not exactly circular. Moreover, the wave generator can have components that are readily replaced during operation, which may increase the overall life of the strain wave gear. Such modifications are not possible in conventional elliptical strain wave gears, as featured in FIG. 12A, unless the entire wave generator is replaced.

Embodiments Implementing Wave Generators with Variable Numbers of Bearings

Figure 12B:
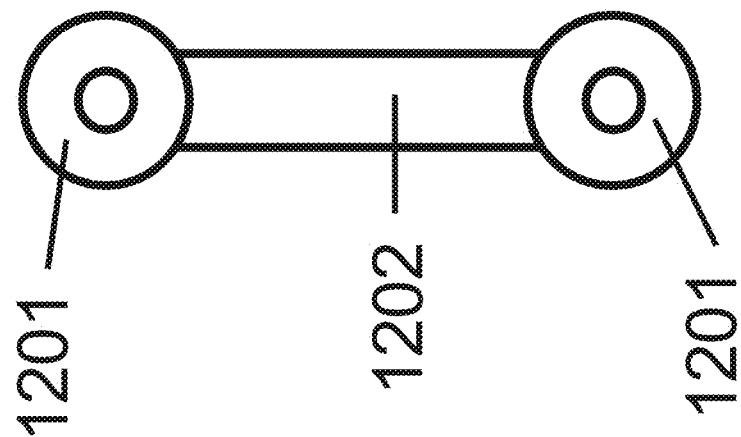
FIG. 12B illustrates a single arm wave generator with circular bearings in accordance with embodiments.
Figure 12A:
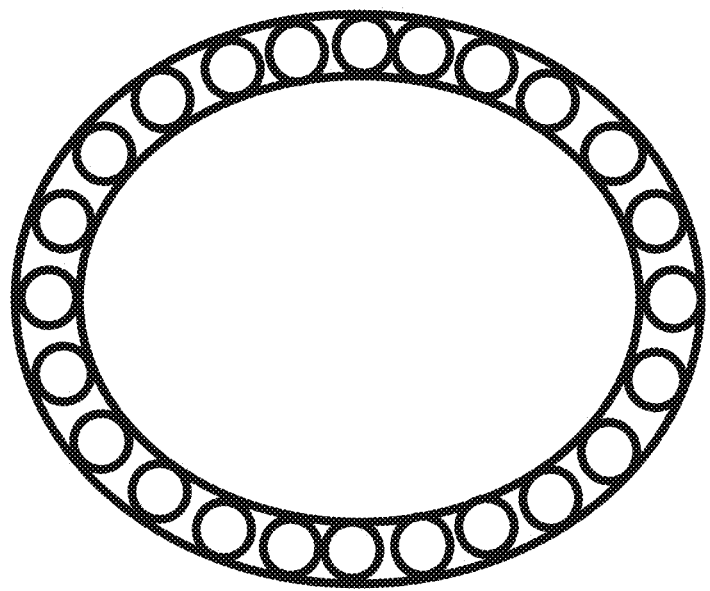
FIG. 12A illustrates a commercial wave generator in accordance with the prior art.
Figure 12D:
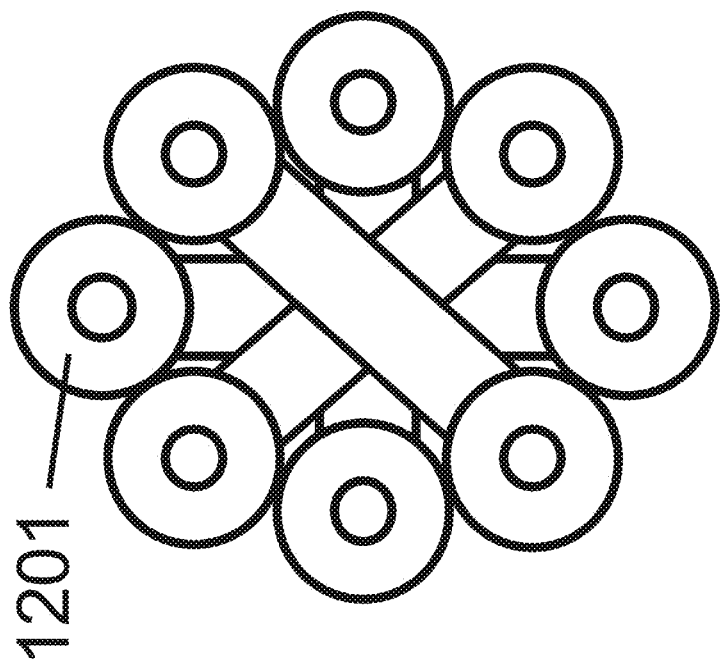
FIG. 12D illustrates different arrangements of bearings of the multiple bearing wave generator in accordance with embodiments.
Figure 12C:
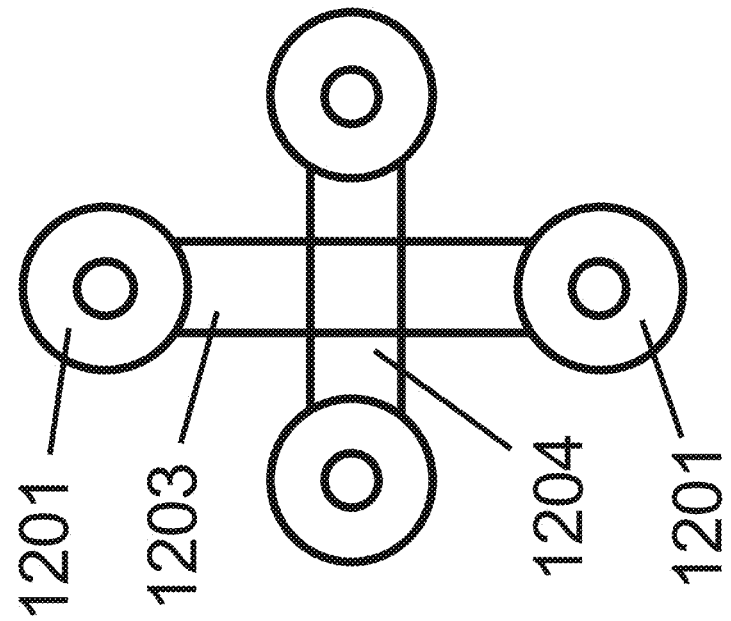
FIG. 12C illustrates different arrangements of bearings wherein the arms are crossed in accordance with embodiments.

Although the above discussion has focused on strain wave gears with specific numbers of bearings, it will be understood that embodiments may use different numbers of bearings to replace the wave generator of a metal strain wave gear. FIGS. 12B, 12C, and 12D show respectively embodiments where the conventional elliptical wave generator is replaced with at least two circular bearings, at least four circular bearings, and at least eight circular bearings. As shown, in many embodiment pairs of circular bearings 1201 are disposed at the opposite ends of support arms. In various embodiments, as shown in FIG. 12B, at least one support arm 1202 has a length equal to the major axis of the ellipse, such that there are at least two points of contact with the flexspline during the operation of the wave generator. In some embodiments, as shown in FIG. 12C, the longer support arm 1203 equals the major axis of the ellipse and the shorter support arm 1204 equals to the minor axis of the ellipse. In many embodiments, at least four points of contact are maintained between the wave generator and the flexspline during operation. In other embodiments, as shown in FIG. 12D, at least eight bearings 1201 are distributed evenly around the perimeter of the ellipse, and eight points of contact are kept with the flexspline during operation.

Although specific arrangements are shown, it will be understood that the circular bearing wave generators may be configured with varying amount of support to the flexspline. The greater the number of circular bearings, the more support the flexspline receives and the longer the flexspline lasts. Each additional set of bearings added to the wave generator extends the life of the flexspline by preventing unsupported areas from overly oscillating.

In many embodiments, the location of the bearings can be adjusted during operation of the strain wave gear using a feedback loop to tailor the performance of the drive to a desired value. In such embodiments, the torque on the flexspline can be increased or decreased by changing the location of the bearings in the wave generator.

Embodiments Implementing Wave Generators with Different Size of Bearings

Figure 12F:
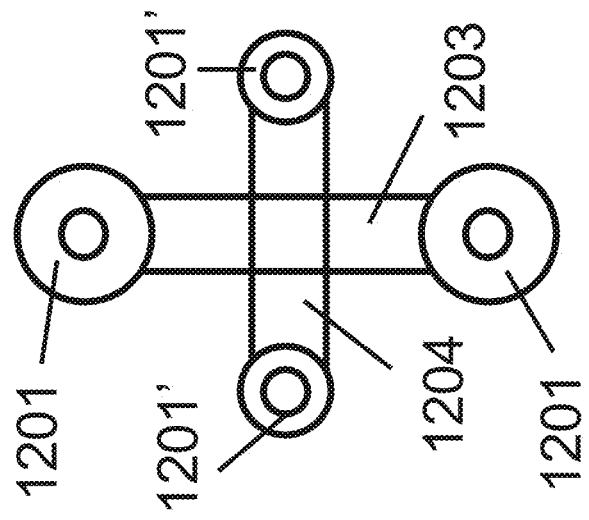
FIG. 12F illustrates different sizes of bearings where the arms are crossed with adjustable major and minor axes in accordance with embodiments.
Figure 12E:
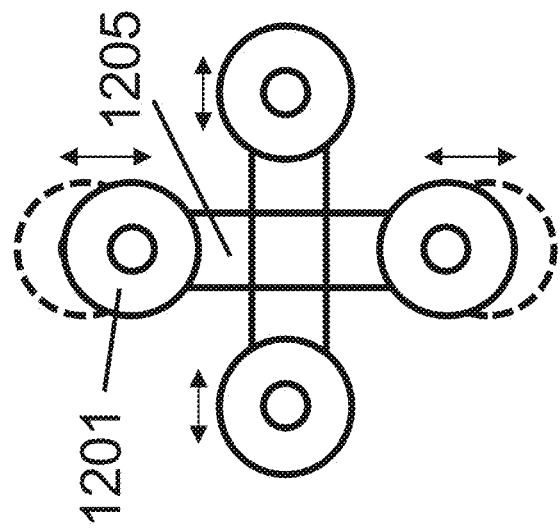
FIG. 12E illustrates different sizes of bearings where the arms are crossed with varying sized bearings to control contact stress in accordance with embodiments.

Although embodiments having bearings of a single size are shown and described above, it should be understood that circular bearings having many different sizes may be implemented in wave generators according to embodiments. As depicted in FIG. 12E, various embodiments implement four circular bearings where two circular bearings 1201 on the same arm are of the same size, and the other circular bearings 1201' are the same size, but where the circular bearings 1201 are of a different size from the circular bearings 1201'. In many such embodiments, the long support arm 1203 may equal the length of the major axis of the ellipse while the short support arm 1204 equals the length of the minor axis. In various embodiments, the diameter of the circular bearings 1201 & 1201' are sized to be smaller than one half of the major axis of the ellipse of the strain wave gear operational size.

During operation, the wave generator may be inserted into the flexspline and then widened to form an elliptical shape. Different sizes of bearings allow modifications to the length of the elliptical axis and fine-tuning of the torque on the flexspline. In such embodiments, the torque on the flexspline can be increased or decreased by changing the size of the bearings in the wave generator.

Embodiments Implementing Wave Generators with Adjustable Arms

Although embodiments described above show rigid support arms, it will be understood that the location of the circular bearings may also be adjustable to provide more or less deformation to the flexspline as required. Various embodiments use adjustable arms 1205 in the four bearing wave generators, as shown in FIG. 12F. The adjustable wave generator allows for modifications of the elliptical axes, or for correcting errors in a flexspline that is not exactly circular, e.g., one that might be 3D printed. With the ability to adjust to different shapes, such wave generators are able to fine-tune the torque on the flexspline or normalize the torque of the flexspline when manufacturing errors exist.

Figure 13:
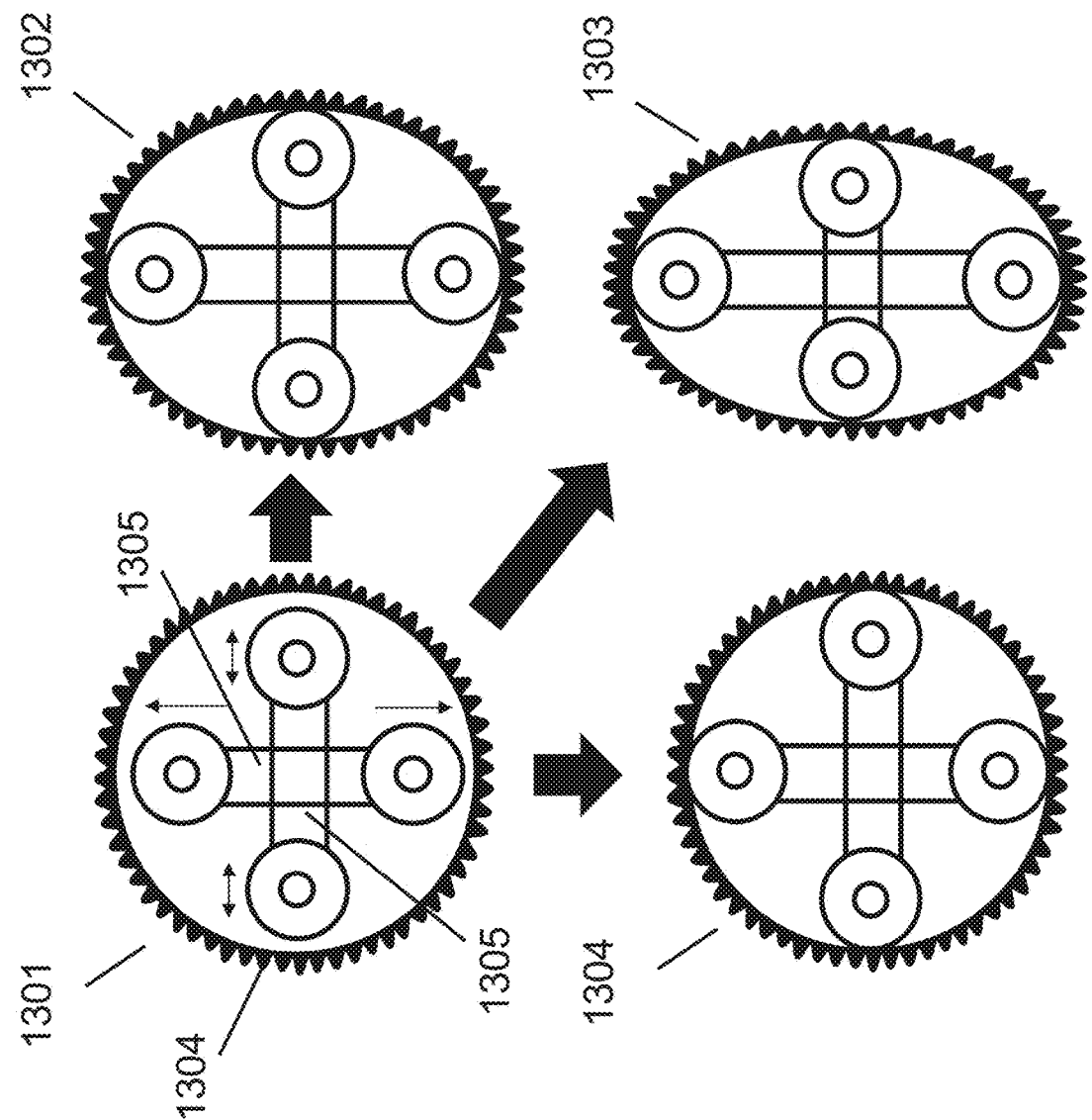
FIG. 13 illustrates the tunability of the current wave generator design where the location of the bearings can be moved to provide more or less flexing to the wave generator to change the efficiency and the torque rating of the strain wave gear in accordance with embodiments.

In some embodiments, such flexibility can be used to increase or decrease the torque as needed on a single strain wave gear. FIG. 13 shows the tunability of the wave generator with adjustable arms 1305. The wave generator can be inserted into the flexspline 1304 and then widened to form an elliptical shape. The location of the bearings can be moved to provide more or less flexing to the wave generator. 1301 depicts the initial position of the wave generator where the wave generator is not touching the flexspline. During operation 1302, it can exhibit nominal operating torque on the strain wave gear. The adjustability also allows high operating torque on the strain wave gear as shown in 1303, or low operating torque as in 1304. The ability to adjust the strain wave gear directly changes the efficiency and the torque rating of the strain wave gear and may be optimized to improve performance.

Figure 14:
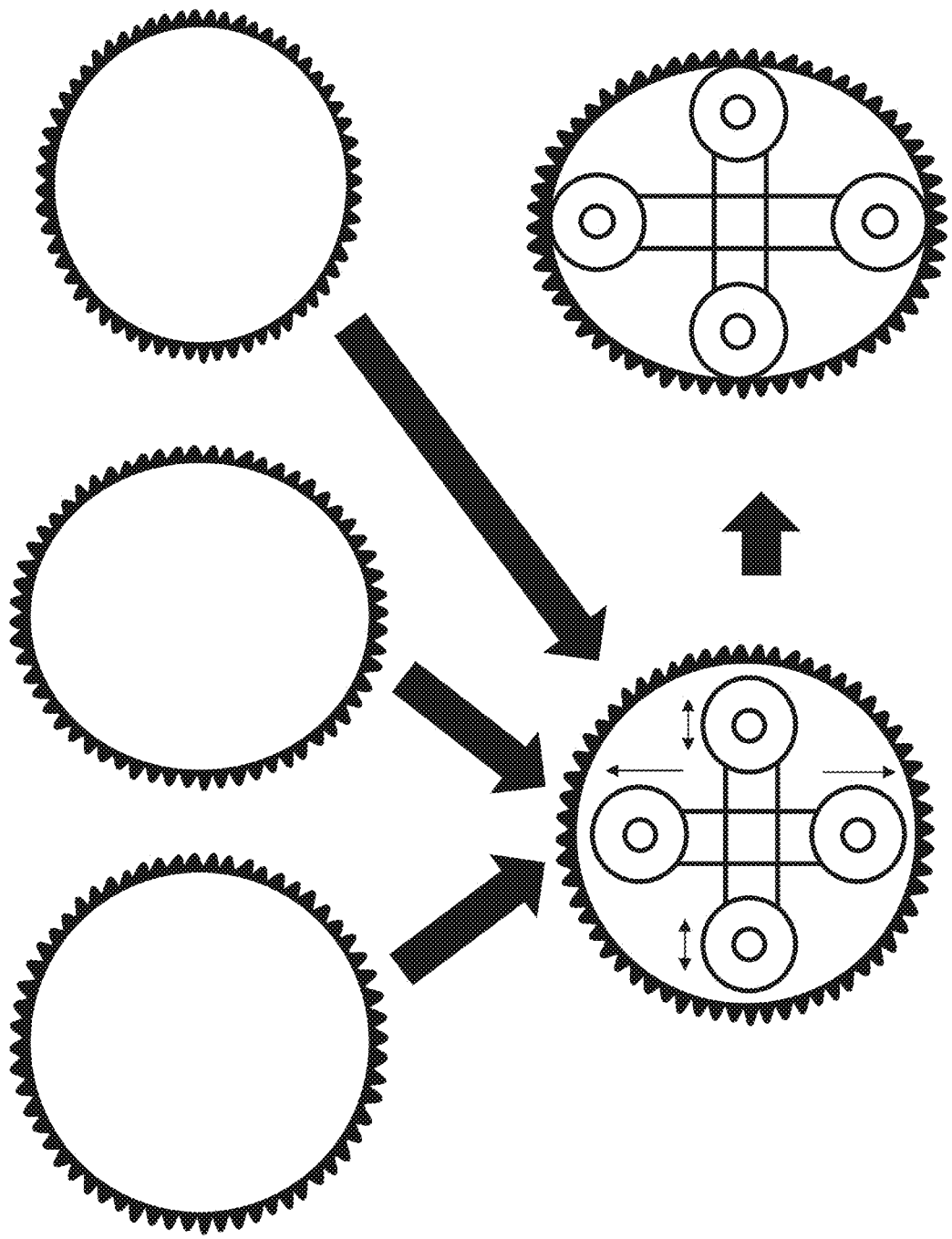
FIG. 14 illustrates an adjustable wave generator that may be used to accommodate manufacturing differences in flexsplines to assure a nominal performance of the total strain wave gear, where the adjustable wave generator can normalize imperfections in shape for consistent operations in accordance with embodiments.

In some other embodiments, the adjustable wave generator has the flexibility to normalize the performance of flexsplines with manufacturing differences. In such embodiments, the locations of the bearings can be modified to accommodate manufacturing differences in the flexsplines so that the efficiency of the strain wave gear between different parts varies by less than 10%. FIG. 14 shows an adjustable wave generator accommodating manufacturing differences in flexsplines to assure a nominal performance of the total strain wave gear. The flexspline can be made through casting or 3D printing process, and have variability in its circularity and size. The adjustable wave generator can normalize imperfections in the flexspline shape for consistent operations.

Embodiments Implementing Wave Generators with Flexible Rinds

Figure 12H:
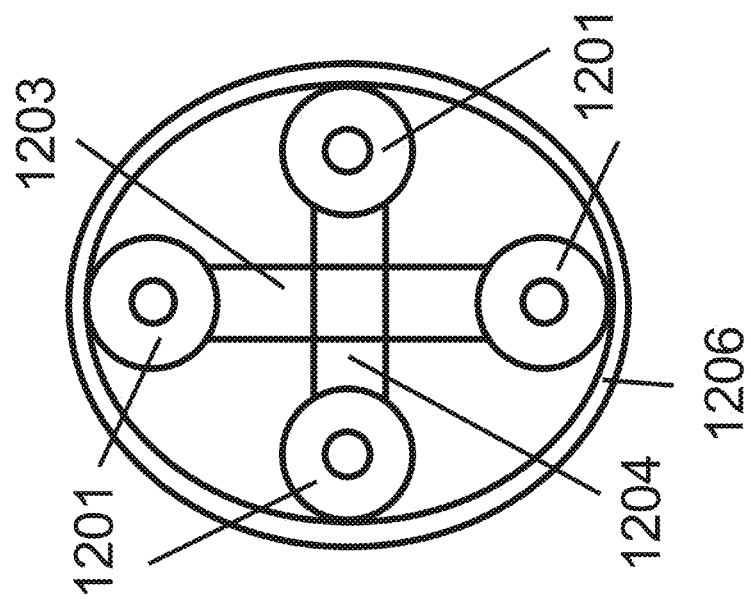
FIG. 12H illustrates crossed arm bearings used to stretch a circular ring where the bearing is not adjustable, but is low cost to manufacture in accordance with embodiments.
Figure 12G:
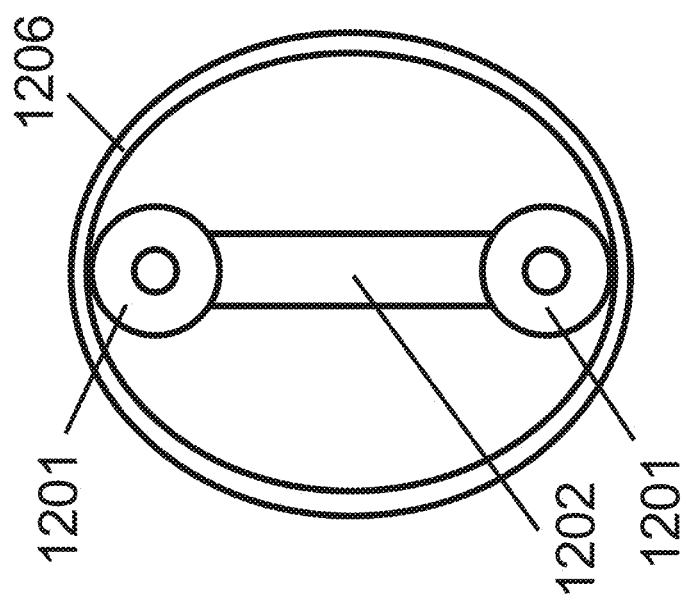
FIG. 12G illustrates single arm bearings used to stretch a circular ring where the bearing is not adjustable, but is low cost to manufacture in accordance with embodiments.

In other embodiments, the wave generator is made with bearings capable of stretching a circular ring. FIG. 12G illustrates two bearings 1201 on a support arm 1202 configured to stretch a flexible circular ring, where the thin flexible metal ring 1206 is placed between the outside of the bearings and the inside wall of the flexspline and is in constant contact with the flexspline during operation. As the length of the arm 1202 is larger than the diameter of the circular ring, the ring displays an elliptical shape. With the constant support from the ring, the brittle flexspline that is in contact with the wave generator would tend to have an increased lifetime. Some other embodiments, as shown in FIG. 12H, use four bearings 1201 to stretch the flexible circular ring. In such embodiments, the long support arm 1203 with two bearings is longer than the ring diameter, and the short support arm 1204 with two bearings is shorter than the ring diameter. The two support arms are crossed at the center and perpendicular to each other. The circular ring is stretched into an ellipse with the two support arms. With the constant support from the ring 1206, the brittle flexspline that is in contact with the wave generator during operation would have a longer lifetime.

Figure 16:
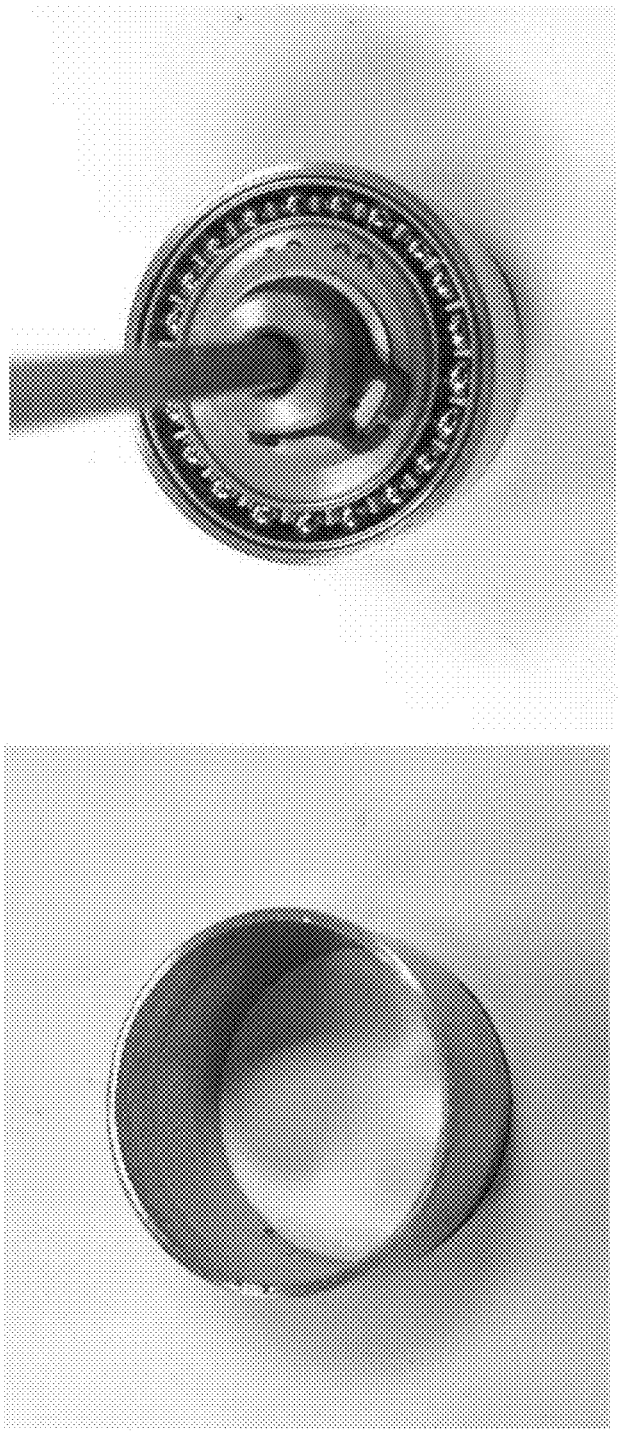
FIG. 16 illustrates an example of a flexible ring made from metallic glass that has been flexed using a conventional elliptical wave generator in accordance with embodiments.
Figure 17:
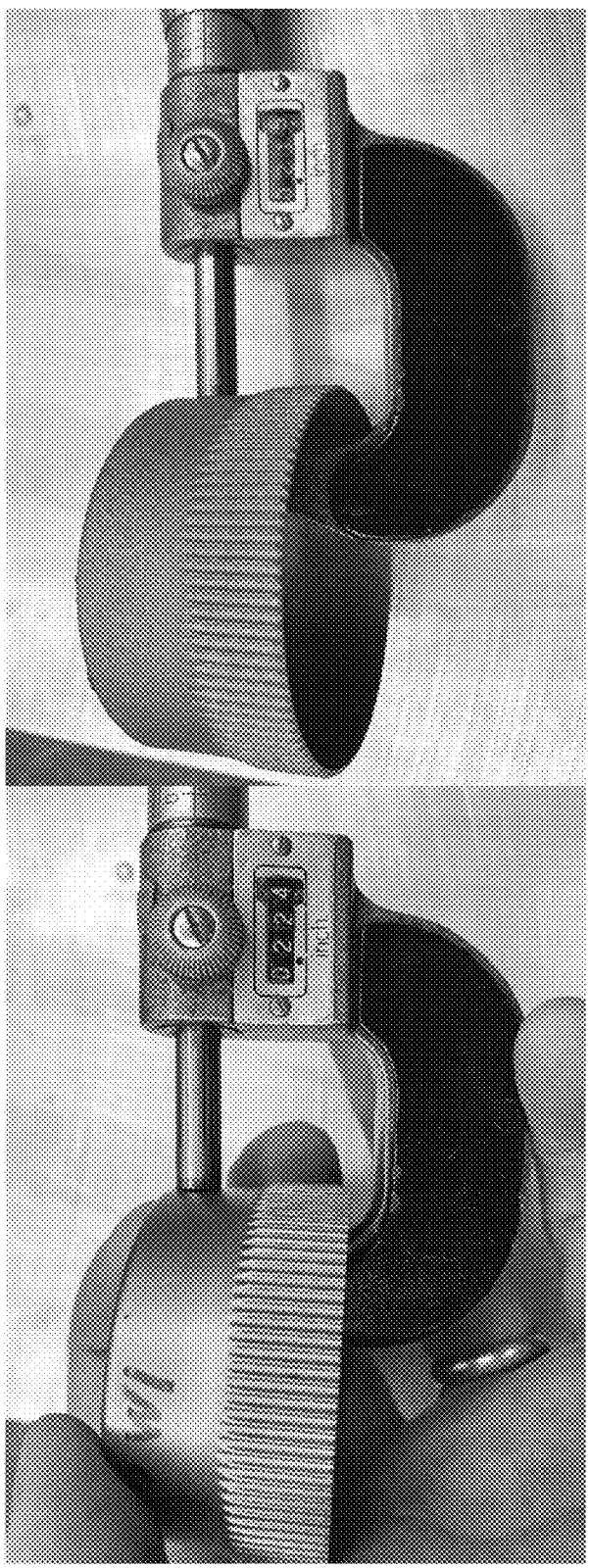
FIG. 17 illustrates a machined steel flexspline with a wall thickness of 0.22–0.20=0.02 inches, an as-printed flexspline with a wall thickness of 0.015 inches, and where variations in manufacturing can be mitigated by having adjustable wave generators that can accommodate any sized flexspline or that can fix non-circularity in the flexspline in accordance with embodiments.

In some embodiments, the metal ring has an interior groove to prevent it from sliding off of the bearings and a smooth outer surface to mate with the flexspline. FIG. 15B provides a side view of such a configuration. The ring requires a groove 1501 to prevent slippage off of the wave generator. Similarly, the bearings need further bearings on the central axis 1502 to allow rotation and must be pinned or bolted in place to prevent slippage. FIG. 16 shows a flexible ring made from metallic glass that has been flexed using a conventional wave generator. The identical shape can be achieved using four bearings, as in FIG. 12H and FIG. 15, instead of the elliptical wave generator.

Many embodiments describe that the bearings are roller bearings, ball bearings or combinations of both. Some embodiments use metal bearings. Some other embodiments use ceramic bearings. In some other embodiments, the bearings are made, at least in part, from a bulk metallic glass. In some embodiments, the bearings are made from steel. In various embodiments, the bearings of the wave generator can be replaced individually after failing due to wear in the bearing. In some other embodiments, the flexible metal ring is made from a metallic glass based material.

Many embodiments show the position and number of bearings can increase the life of a flexspline made from a brittle bulk metallic glass alloy. In some embodiments, the wave generator fails within 10% of the number of cycles that the flexspline fails at. Many other embodiments describe that an adjustable wave generator can improve the fatigue performance of a bulk metallic glass-based flexspline by at least 10% compared to a standard elliptical wave generator.

Many embodiments describe the replacement of an elliptical wave generator with a series of bearings would render the performance of the drive drop dramatically, as the precision of the way pieces fit decreases. Moreover, each small bearing would be under an enormous load compared to the bearings in an elliptical wave generator, which will rapidly decrease their life. However, the low-cost flexsplines can be made at a fraction of the cost of machined steel versions using 3D printing and casting. These low cost flexspline have much worse performance and tolerance than machined versions and will fail much sooner than the wave generator. As such, the performance of the wave generator can be dramatically decreased to more closely match the failure of the flexspline. Many embodiments can also be used when customized materials are used in the flexspline for specific environmental conditions. For example, the flexspline may be made from high temperature materials, like Inconel or tantalum. The flexspline could be made from low temperature materials, like metallic glass; or it could be made from high wear resistant alloys, like tool steel. These flexsplines may be more brittle than standard steel, and thus do not require such a long life. As such, the wave generator can have its performance reduced to compensate. Many embodiments could be useful in the case of high temperature applications because ceramic ball bearings or roller bearings could be used in the wave generator, which could not be easily integrated into a commercial wave generator.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A wave generator for a metal strain wave gear comprising, at least four circular bearings;
   wherein the at least four circular bearings are disposed within a circular flexspline to form an elliptical shape;
   wherein at least two circular bearings are on a first support feature, wherein the first support feature has a length equal to the major axis of the elliptical shape, wherein the first support feature has an adjustable length wherein at least one of the at least two circular bearings is disposed on a first end of the first support feature and a second of the at least two circular bearings is disposed on a second end of the first support feature, wherein the first support feature is either an arm or a solid block;
   wherein at least two further circular bearings are disposed on a second support feature, wherein the second support feature has a length equal to the minor axis of the elliptical shape, wherein at least one of the two further circular bearings is disposed on a first end of the second support feature and a second of the at least two circular bearings is disposed on a second end of the second support feature, wherein the second support feature is either an arm or a solid block, wherein the first support feature is longer than the second support feature; and wherein the circular bearings are configured such that at least four points of contact are maintained between the wave generator and the flexspline.

2. The wave generator for a metal strain wave gear of claim 1, comprising at least eight circular bearings;

wherein the at least eight circular bearings are disposed within a circular flexspline to form an elliptical shape;

wherein at least eight circular bearings are distributed on the circumference of the elliptical shape;

wherein at least two circular bearings are on a first support arm, wherein at least one of the at least two circular bearings is disposed on a first end of the first support arm and a second of the at least two circular bearings is disposed on a second end of the first support arm;

wherein at least two further circular bearings are on a second support arm, wherein at least one of the at least two further circular bearings is disposed on a first end of the second support arm and a second of the at least two further circular bearings is disposed on a second end of the second support arm;

wherein at least two further circular bearings are on a third support arm, wherein at least one of the at least two further circular bearings is disposed on a first end of the third support arm and a second of the at least two further circular bearings is disposed on a second end of the third support arm;

wherein at least the two further circular bearings are on a fourth support arm, wherein at least one of the two further circular bearings is disposed on a first end of the fourth support arm and a second of the at least two further circular bearings is disposed on a second end of the fourth support arm; and wherein the circular bearings are configured such that at least eight points of contact are maintained between the wave generator and the flexspline.

3. The wave generator for a metal strain wave gear of claim 1, wherein the circular bearings comprise roller bearings.

4. The wave generator for a metal strain wave gear of claim 1, wherein the circular bearings comprise ball bearings.

5. The wave generator for a metal strain wave gear of claim 1, wherein the circular bearings comprise roller bearings and ball bearings.

6. The wave generator for a metal strain wave gear of claim 1, wherein the circular bearings comprise a metallic glass based material.

7. The wave generator for a metal strain wave gear of claim 1, wherein the circular bearings comprise a ceramic material.

8. The wave generator for a metal strain wave gear of claim 1, wherein the circular bearings comprise a steel material.

9. The wave generator for a metal strain wave gear of claim 1, wherein the diameter of the circular bearings is less than one half of the length of the major axis of the elliptical shape.

10. The wave generator for a metal strain wave gear of claim 1, wherein the support arm lengths are adjustable.

11. The wave generator for a metal strain wave gear of claim 10, wherein the adjustable support arms improve the fatigue performance of a bulk metallic glass-based flexspline by at least 10% compared to an elliptical wave generator.

12. The wave generator for a metal strain wave gear of claim 1, wherein the circular bearings are same sizes.

13. The wave generator for a metal strain wave gear of claim 1, wherein the circular bearings are different sizes.

14. The wave generator for a metal strain wave gear of claim 1, wherein the flexspline comprises a high temperature material, wherein the high temperature material comprises Inconel and tantalum.

15. The wave generator for a metal strain wave gear of claim 1, wherein the flexspline comprises a low temperature material, wherein the low temperature material comprises a metallic glass based material.

16. The wave generator for a metal strain wave gear of claim 1, wherein the flexspline comprises a high wear resistant alloy, wherein the high wear resistant alloy comprises a tool steel.

17. A wave generator for a metal strain wave gear of claim 1, wherein a flexible metal ring is disposed between the outside of the circular bearings and the inside wall of the flexspline; and wherein the ring is in constant contact with the flexspline during operation.

18. The wave generator for a metal strain wave gear of claim 17, wherein the flexible metal ring has a first grooved surface to prevent from sliding off of the circular bearings and a second smooth surface to mate with the flexspline.

19. The wave generator for a metal strain wave gear of claim 17, wherein the flexible metal ring comprises a metallic glass based material.

* * * * *